(12) United States Patent
Fram

(10) Patent No.: US 8,696,121 B1
(45) Date of Patent: Apr. 15, 2014

(54) VIEWING VERIFICATION SYSTEMS

(76) Inventor: Evan K. Fram, Paradise Valley, AZ (US)

( * ) Notice: Subject to any disclaimer, the term of this patent is extended or adjusted under 35 U.S.C. 154(b) by 281 days.

(21) Appl. No.: 13/227,301

(22) Filed: Sep. 7, 2011

Related U.S. Application Data

(63) Continuation of application No. 12/860,722, filed on Aug. 20, 2010, now Pat. No. 8,020,993, which is a continuation of application No. 11/668,680, filed on Jan. 30, 2007, now abandoned.

(60) Provisional application No. 60/763,259, filed on Jan. 30, 2006.

(51) Int. Cl.
*A61B 3/10* (2006.01)
*A61B 3/00* (2006.01)

(52) U.S. Cl.
USPC ............................ 351/204; 351/200; 351/205

(58) Field of Classification Search
USPC .................................. 351/200, 204–205, 210
See application file for complete search history.

(56) References Cited

U.S. PATENT DOCUMENTS

| | | | |
|---|---|---|---|
| 4,927,260 A | 5/1990 | Gordon |
| 5,430,505 A | 7/1995 | Katz |
| 5,481,622 A | 1/1996 | Gerhardt et al. |
| 5,589,897 A | 12/1996 | Sinclair et al. |
| 5,649,061 A | 7/1997 | Smyth |
| 6,027,216 A | 2/2000 | Guyton et al. |
| 6,084,556 A | 7/2000 | Zwern |
| 6,381,339 B1 | 4/2002 | Brown et al. |
| 6,466,232 B1 | 10/2002 | Newell et al. |
| 6,573,883 B1 | 6/2003 | Bartlett |
| 6,574,352 B1 | 6/2003 | Skolmoski |
| 6,659,611 B2 | 12/2003 | Amir et al. |
| 6,758,563 B2 | 7/2004 | Levola |
| 6,873,314 B1 | 3/2005 | Campbell |
| 6,886,137 B2 | 4/2005 | Peck et al. |
| 6,906,619 B2 | 6/2005 | Williams et al. |
| 8,020,993 B1 | 9/2011 | Fram |
| 2002/0196290 A1 | 12/2002 | Zlotnick |
| 2004/0254763 A1 | 12/2004 | Sakai et al. |

*Primary Examiner* — Dawayne A Pinkney
(74) *Attorney, Agent, or Firm* — Knobbe, Martens, Olson & Bear LLP

(57) ABSTRACT

A viewing verification system is disclosed that allows a user to view an image by providing a viewer for the image, determining the space bounded by the foveal-vision of the user, verifying whether substantially the entire meaningful portion of the image has been correlated to the space bounded by the foveal vision of the user.

21 Claims, 15 Drawing Sheets

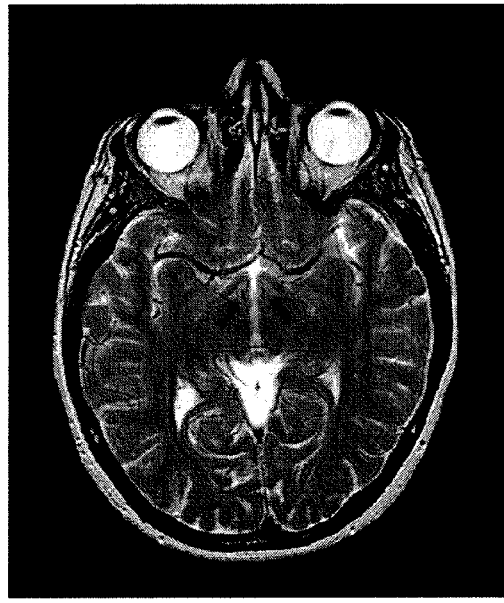 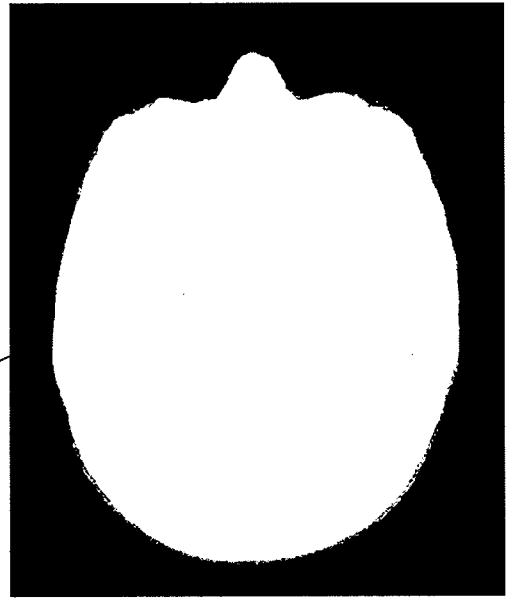
FIG. 10   FIG. 11
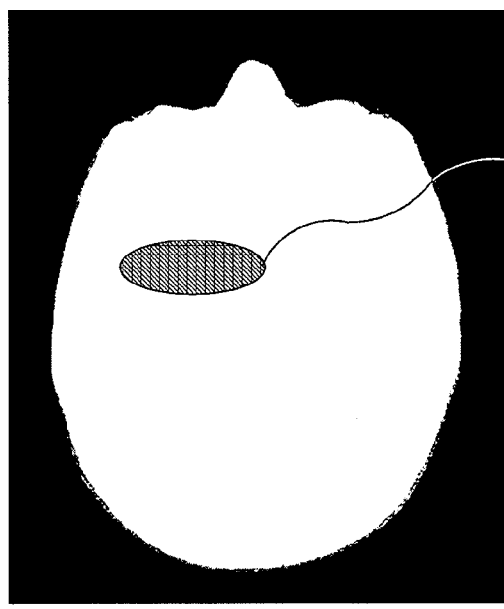 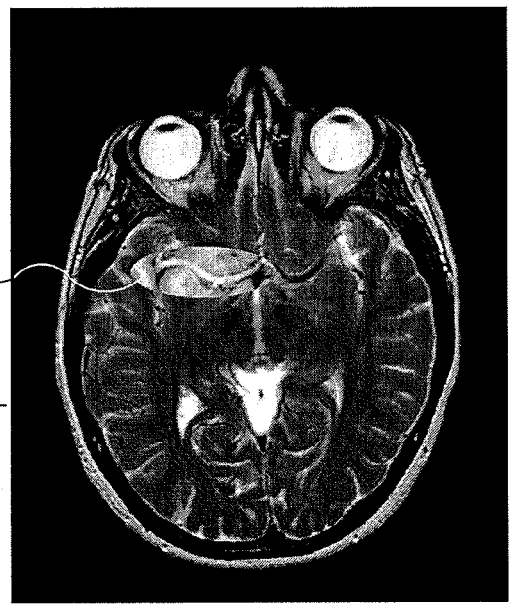
FIG. 12   FIG. 13

FIG. 18

| Viewer | Image | X-axis | Y-axis | Scale | Contrast | Timer | Meaningful? | Viewed? |
|---|---|---|---|---|---|---|---|---|
| Bob47 | Xray12 | 14 | 12 | 1:10 | 1:100 | 1.27 | Y | N |
| Bob47 | Xray12 | 14 | 13 | 1:10 | 1:100 | 0 | N | N |
| Bob47 | Xray12 | 15 | 12 | 1:2 | 1:10 | 9.09 | Y | Y |
| Bob47 | Xray12 | 15 | 13 | 1:1 | 1:10 | 11.0 | N | Y |
| ... | | | | | | | | |

| Viewer | Image | X-axis | Y-axis | Z-axis | Rotation | Timer | Meaningful? | Viewed? |
|---|---|---|---|---|---|---|---|---|
| Amy11 | Scan5 | 55 | 22 | 6 | 90 | 14.1 | Y | Y |
| Amy11 | Scan5 | 55 | 22 | 6 | 180 | 0 | N | N |
| Amy11 | Scan5 | 55 | 22 | 9 | 180 | 11.1 | Y | N |
| Amy11 | Scan5 | 55 | 22 | 11 | 251 | 14.1 | Y | Y |
| ... | | | | | | | | |

| Viewer | Image | X-axis | Y-axis | Z-axis | Time-axis | Filter | Timer | Meaningful? | Viewed? |
|---|---|---|---|---|---|---|---|---|---|
| Bob47 | CT995 | 939 | 912 | 6 | 10 | Red | 11.1 | Y | Y |
| Bob47 | CT995 | 939 | 912 | 6 | 11 | Red | 1.1 | Y | N |
| Bob47 | CT995 | 939 | 912 | 6 | 12 | Red | 1.1 | Y | N |
| Bob47 | CT995 | 939 | 912 | 6 | 13 | Blue | 60.1 | Y | Y |
| ... | | | | | | | | | |

500, 502, 504, 506, 508, 510, 512, 514, 516, 518, 520

VIEWING VERIFICATION SYSTEMS

CROSS-REFERENCE TO RELATED APPLICATIONS

This application is a continuation of U.S. application Ser. No. 12/860,722, filed Aug. 20, 2010, entitled "VIEWING VERIFICATION SYSTEMS", which is a continuation of U.S. application Ser. No. 11/668,680, filed Jan. 30, 2007, entitled "VIEWING VERIFICATION SYSTEMS," which claims the benefit of U.S. Provisional Application Ser. No. 60/763,259, filed Jan. 30, 2006, each of which are hereby expressly incorporated by reference in their entireties.

BACKGROUND

Failure to evaluate relevant visual information completely can lead to adverse consequences. In many cases, such as with medical imaging, no general methods exist that allow computer systems to detect abnormalities reliably, so human viewing is the usually the best available method for reliably detecting abnormalities. Detection of abnormalities and interpretation of the information relies on the human user's ability to detect and analyze abnormalities.

If the user does not view something, then it is not possible for him to detect and analyze it. For example, a doctor who never views a portion of a medical imaging exam cannot detect abnormalities within the unviewed portion. This can result in significant medical errors, such as missed cancers. A security screener who fails to view all the information on the screen of an x-ray baggage scanning device cannot detect the image of a gun passing through the machine.

Typically, a viewer of an image must rely on his or her own internal sense of having adequately viewed the image. This invention relates to a system that monitors a viewer as he views an image and provides feedback as to whether he has completely viewed the image. There are currently no systems that ensure that the user has adequately viewed all the relevant visual information presented.

Visual acuity varies across the visual field, with a small, roughly circular region of high resolution vision centrally (foveal or central vision) and lower resolution vision peripherally (peripheral vision). This variation in visual acuity is the result of a variation in the density and type of visual receptors within the retina at the back of the eye.

High resolution central vision or foveal vision is accomplished by a small region in the retina, the fovea, which contains densely packed visual receptors. This region represents the center of visual attention and also contains visual receptors responsible for color vision and daytime vision. The fovea provides sharp central vision needed for reading, examining medical imaging exams, and other activities were visual detail is important.

Because central vision is only a small part of the visual field, a viewer must scan an image to adequately view it in its entirety, rapidly moving from one site of visual fixation to the next through a series of visual saccades. If a viewer fails to view the portion an image containing a critical feature using his foveal vision for a sufficient duration, that critical feature, such as a cancer in a medial imaging exam, may be missed by the viewer.

Existing systems do not provide a means to verify that all critical portions of an image were viewed by central vision. Existing systems do not provide a means for indicating that an image was viewed with foveal-vision for a sufficiently long period to have been adequately viewed by the user.

Advances in medical imaging equipment, such as computed tomography (CT) and magnetic resonance imaging (MRI) have resulted in a tremendous increase in the number of images acquired for each imaging exam, commonly approaching and sometimes exceeding 1,000 images per exam. In addition, the number of imaging exams performed each year is growing. In addition, there is a shortage of radiologists, physicians who specialize in the interpretation of medical imaging exams.

The radiology field recognizes a data overload problem, where radiologists can become overloaded by too much data, too many images, and too many exams. Important diagnoses may be missed, as subtle, but important, imaging findings can be buried within very large imaging exams. These issues increase the need for inventions such as this.

In the past, medical images were traditionally recorded and viewed on x-ray film. Over the past decade, medical imaging has moved into the digital realm, where images are managed and viewed using computer systems known as picture archive and communication systems (PACS). While PACS systems have made the viewing of these large exams more practical, they have not eliminated medical errors related to misinterpretation of imaging exams. In fact, PACS systems allow radiologists to navigate through these large imaging datasets at speeds that can exceed their ability to detect all abnormalities. In the context of medical imaging, the goal of this invention is to reduce medical errors related to interpretation of medical images by monitoring the thoroughness with which the viewer has examined a medical imaging exam.

Knowing that an image is adequately viewed, and therefore, knowing that the image could be consciously considered by the viewer, would be highly beneficial to reducing errors in many tasks requiring visual perception, including those outside of medical imaging.

OBJECTS AND FEATURES OF THE INVENTION

A primary object and feature of the present invention is to provide a system for verifying that the meaningful portions of image have been adequately viewed.

It is a further object and feature of the present invention to provide a system capable of storing and recalling the results of viewing a large set of image data.

It is another object and feature of the present invention to provide a system capable of being adapted to view and verify many types of images, such as word processing documents, reports, database information, medical images, and airport security scanners.

It is yet a further object and feature of the present invention to provide a system capable of giving a user feedback about which portions of an image have been adequately viewed and which portions remain to be viewed.

It is another primary object and feature of the present invention to reducing errors in evaluating large amounts of image data.

A further primary object and feature of the present invention is to provide such a system that is efficient, inexpensive and handy. Other objects and features of this invention will become apparent with reference to the following descriptions.

SUMMARY OF THE INVENTION

A viewing verification system is disclosed that allows a user to view an image by providing a viewer for the image, determining the space bounded by the foveal-vision of the user, verifying whether substantially the entire meaningful portion of the image has been correlated to the space bounded by the foveal-vision of the user.

A medical image viewing verification system is also disclosed that allows at least one user to view at least one medical image by providing a display to display said at least one medical image; a foveal-vision determiner to determine the space bounded by the foveal-vision of said at least one user; an indicator to indicate at least one portion of said at least one medical image has been correlated to the space bounded by the foveal-vision of said at least one user.

A document verification system is also disclosed that allows a user to view a document by displaying a document; determining the space bounded by the foveal-vision of the user; determining a text of the document; and verifying whether said the text of the document has not been correlated to the space bounded by the foveal-vision of said at least one user.

A viewing verification system is also disclosed that allows a user to view an image by providing a system to encode the image into a data structure; to correlate the foveal-vision of the user to the image correlation information; and encoding the correlation information into a similar, or identical, data structure.

BRIEF DESCRIPTION OF THE DRAWINGS

FIG. 10 shows a view illustrating an axial T2 weighted MRI image of the brain as displayed according to another preferred embodiment of the present invention.

FIG. 11 shows a diagrammatic view illustrating a data structure representing the irrelevant, homogeneous portions of the axial T2 weighted MRI image of the brain of FIG. 10.

FIG. 12 shows a diagrammatic view illustrating a foveal-vision correlation data structure of the axial T2 weighted MRI image of the brain of FIG. 10.

FIG. 13 shows a view illustrating an image nearly identical to FIG. 10, except that the area that has been adequately viewed, as shown by the foveal-vision correlation data structure of FIG. 12, is contrast inverted.

FIG. 18 shows a diagrammatic view illustrating a foveal-vision correlation data structure for a two dimensional image according to another preferred embodiment of the present invention.

FIG. 19 shows a diagrammatic view illustrating a foveal-vision correlation data structure for a three dimensional image according to another preferred embodiment of the present invention.

FIG. 20 shows a diagrammatic view illustrating a foveal-vision correlation data structure for a four dimensional image, which includes three spatial dimensions and one time dimension, according to another preferred embodiment of the present invention.

DETAILED DESCRIPTION

Figure 1:
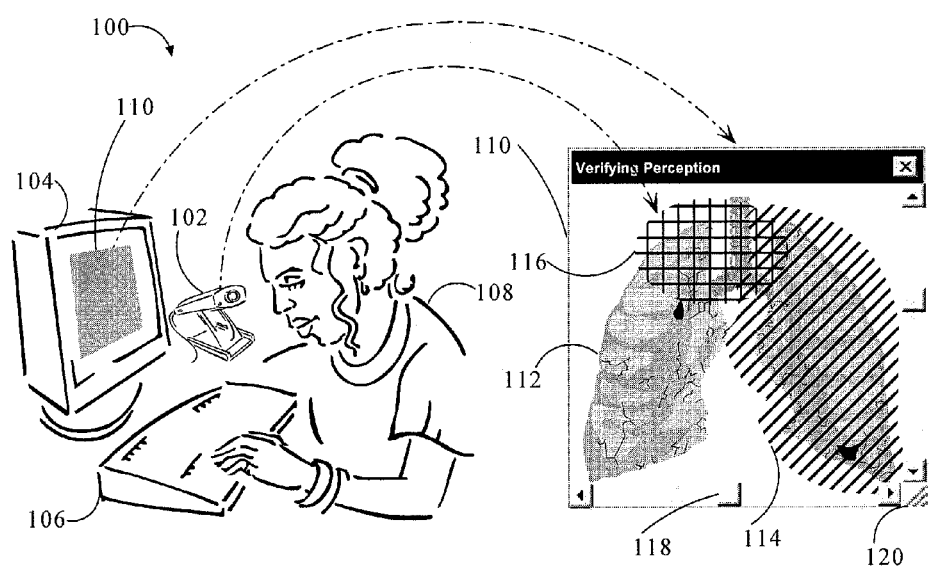
FIG. 1 shows a perspective view illustrating a viewing verification system according to a preferred embodiment of the present invention.

FIG. 1 shows a perspective view illustrating a viewing verification system according to a preferred embodiment of the present invention. Preferably, viewing verification system 100 comprises eye tracker 102, display 104, computer 106, and vision correlation program 110, as shown. Preferably, user 108 selects image 112 for viewing, as shown. Preferably, vision correlation program 110 shows image 112 on display 104, such that user 108 may begin viewing image 112, as shown. Preferably, eye tracker 102 monitors the area of foveal-vision 116 of user 108, as shown. Preferably, eye tracker 102 transmits the location of foveal-vision 116 of user 108 to vision correlation program 110, as shown. Preferably, vision correlation program 110 correlates foveal-vision 116 to a portion of image 112, as shown. Preferably, vision correlation program 110 optionally times the duration of such correlation of the foveal-vision of user 108 and each portion of image 112. Preferably, vision correlation program 110 computes whether the continuous duration of correlation is longer than the minimum adequate viewing time of user 108. Preferably, vision correlation program 110 will display the portions of image 112 that have been correlated as perception highlight 114, as shown. Preferably, perception highlight 114 will indicate alternatively to the user which portions of image 112 have not been adequately viewed. Preferably, user 108 may toggle perception highlight 114 on and off as desired. Preferably, system 100 may alert the user whenever all relevant regions of the image have been adequately viewed. Preferably, user 108 may request scrolling of image 112 by scroll function 118, such that images too large to fit on display 104 may be viewed by scrolling, as shown. Preferably, user 108 may request zooming of image 112 by zoom function 120, such that important portions of image 112 may be viewed with at greater magnification or scale, as shown. Preferably, vision correlation program 110 comprises a graphical user interface that allows different display setting to allow the user to change image magnification and navigate to other regions of the image outside of the viewing area.

Preferably, image 112 may comprise a variety of images, such as word processing documents, airport luggage scanner images, airplane pilot control panels and medical images. Doctors routinely view very large sets of medical images from imaging devices, such as computed tomography, magnetic resonance imaging, ultrasound, x-rays, etc. These medical images may be used to detect abnormalities and make medical diagnoses. Medical images may be simple two-dimensional images, for example, an x-ray. Medical images may be a set of related two-dimensional images, for example, a series of substantially contiguous, substantially parallel slices through a patient's body.

Alternatively, a series of medical images could be obtained over a period of time, for example, a cardiac study could demonstrate heart motion over time, a nuclear medicine gastric motility study could demonstrate passage of nuclear medicine agent over time, a contrast enhanced breast MRI could demonstrate alterations in enhancement over time, etc. A three dimensional medical image could be obtained by using three-dimensional volumetric acquisition over a portion of a patient's body, for example using magnetic resonance imaging (MRI), computed tomography (CT), positron emission tomography (PET), ultrasound, radiography, mammography, nuclear medicine, angiography, etc. A four dimensional medical image could be obtained by three dimensional techniques obtained at different times. Security personnel screening baggage at airports view a large amount of visual information in an attempt to detect dangerous contents of luggage.

Pilots view large amounts of visual information, both outside the plane as well as within the cockpit. Many people read large amounts of textual information that is critical to decision making, for example, multi-page legal contracts, complex and simple financial reports, database records or medical lab results. For this application and claims, the word "set" should have its normal mathematical meaning: "a collection of one or more elements." Upon reading the teachings of this specification, those with ordinary skill in the art, will now understand that, under appropriate circumstances, considering issues such as document generation systems, document importance, imaging technology, user preference, economic considerations, etc., other types of images, such as business reports, email, text messages, visual information viewed by air traffic controllers, cockpits of airplane pilots, satellite images, etc., may suffice.

Preferably, eye tracker 102 comprises means for identifying the direction of the vision of user 108. Preferably, eye tracker 102 comprises a video camera that monitors the direction of the gaze of user 108, as shown. Preferably, eye tracker 102 is mounted in a fixed position relative to display 104. Alternately preferably, eye tracker 102 is mounted in a fixed position relative to the eye of user 108. In another preferred embodiment of the present invention, an eye tracker comprises at least one scene camera and at least one eye-tracking camera. In another preferred embodiment of the present invention, an eye tracker comprises a head mounted eye-tracking system. Alternately preferably, eye tracker 102 could comprise any one of the commercially available eye trackers, such as those available through SR Research Ltd, of Osgoode, ON; Arrington Research of Scottsdale, Ariz.; Tobii of McLean, Va., and Applied Science Laboratories, of Bedford, Mass. Upon reading the teachings of this specification, those with ordinary skill in the art, will now understand that, under appropriate circumstances, considering issues such as ergonomic considerations, advances in technology, user preference, economic considerations, etc., other types of eye tracking devices, such as head-mounted eye-trackers, may suffice. (At least embodying herein "eye-tracking means.")

Preferably, display 104 comprises some means for viewing an image. In a preferred embodiment of the present invention, display 104 comprises a computer display, such as a cathode ray tube monitor (CRT monitor), liquid crystal display (LCD display), etc. Upon reading the teachings of this specification, those with ordinary skill in the art, will now understand that, under appropriate circumstances, considering issues such as ergonomic considerations, advances in technology, user preference, economic considerations, etc., other types of viewers and displays, such as head-mounted viewers, multi-screen displays, cell phone displays, projection displays, etc., may suffice. (At least embodying herein "viewing means for viewing"; or at least alternately embodying herein "viewing means comprises at least one computer display"; or at least alternately embodying herein "displaying means for displaying"; or at least alternately embodying herein "displaying means comprises at least one computer monitor"; or at least alternately embodying herein "at least one viewer structured and arranged to view"; or at least alternately embodying herein "at least one viewer comprises at least one computer display.")

Figure 2:
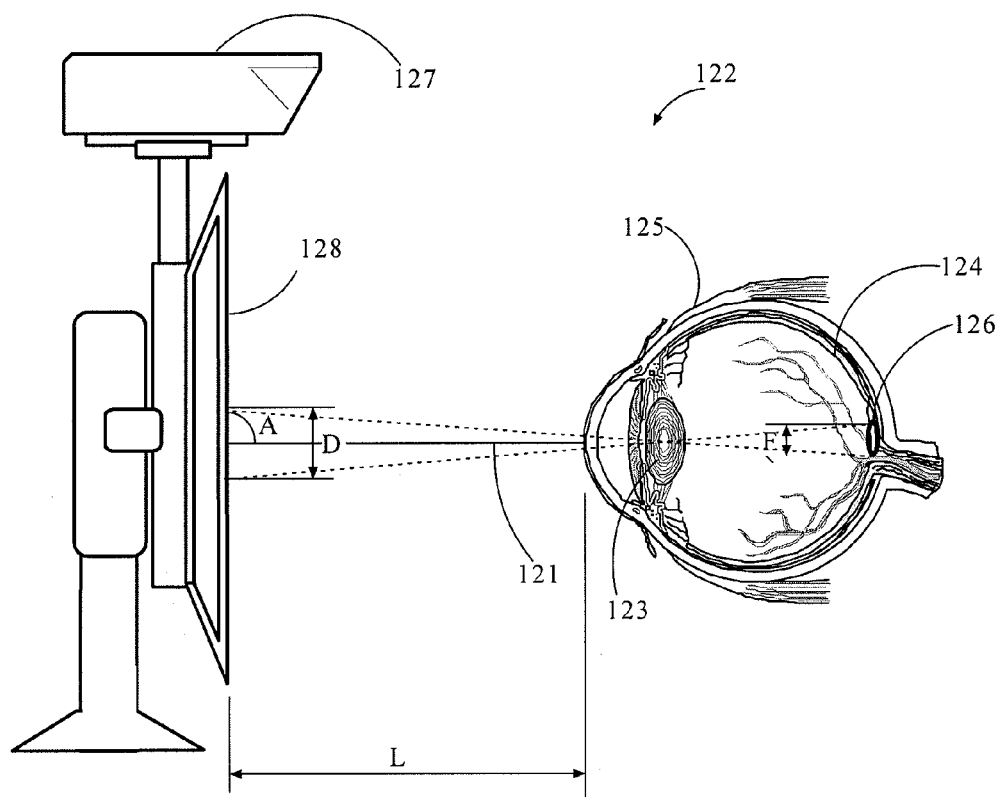
FIG. 2 shows a cross-sectional view illustrating an image being projected onto the fovea of a human eye gazing at a viewing verification system according to another preferred embodiment of the present invention.

FIG. 2 shows a cross-sectional view illustrating an image being projected onto the fovea of a human eye gazing at a viewing verification system according to another preferred embodiment of the present invention. Preferably, viewing verification system 122 comprises eye tracker 127 and display 128, as shown.

Eye 125 focuses light through lens 123 on retina 124, where light is perceived by specialized cells. Retina 124 contains a depressed area called fovea centralis 126. Fovea centralis 126 comprises an average diameter F. Under lighted conditions, this is the center of greatest visual acuity. This fovea has the best clarity of form and color of any area of human vision. The fovea comprises a dense accumulation of color-sensitive, visual receptor cells. The visual information that is viewed by this small region of foveal-vision can be assessed at high resolution. While information outside the central visual field, for simplicity referred to as peripheral vision, is perceived, this information is perceived at only low resolution. High-resolution examination of complex visual information is preferably viewed using central vision. The shape, including size, of foveal-vision varies from person to person. For this application, the foveal-vision is the vision detected by the central portion of a person's visual field that is capable of viewing information at high resolution, a functional region that may be larger than the region that anatomically maps to the fovea centralis. Human vision is also limited in that it is possible to view something so rapidly, even using central vision, that there is insufficient time for accurate visual perception.

Preferably, in order for an image to be perceived, the image should be adequately viewed. Preferably, adequately viewed means viewed with foveal-vision. Alternately preferably, adequately viewed means viewed with foveal-vision for a sufficient period of time to allow perception. Preferably, such a sufficient period of time to allow perception may vary by user. Preferably, such a sufficient period of time may vary by the type of information being analyzed. Preferably, such a sufficient period of time may vary by type of image being viewed. Preferably, such a sufficient period of time to allow perception may vary by training. Preferably, such a sufficient period of time to allow perception may be determined by testing. Preferably, such a sufficient period of time may vary according to user preference. Preferably, such a sufficient period of time to allow perception may represents a period for conscious perception. Preferably, such a sufficient period of time to allow perception may represent a period for unconscious perception. Preferably, such a sufficient period of time to allow perception may comprise a period for conscious and unconscious perception. Upon reading the teachings of this specification, those with ordinary skill in the art, will now understand that, under appropriate circumstances, considering issues such as document type, document importance, imaging technology, user preference, economic considerations, etc., other periods of minimum adequate viewing time, may suffice. (At least embodying herein "duration of the correlation between at least one portion of at least one image and the space bounded by the foveal-vision of at least one user"; or at least alternately embodying herein "timing means for timing whether the duration of the correlation between at least one meaningful portion and the space bounded by the foveal-vision"; or at least alternately embodying herein "timing means for timing whether the duration of the correlation"; or at least alternately embodying herein "indicating the duration of the correlation.")

Preferably, eye 125 views display 128 along gaze direction 121, as shown. Preferably, eye-tracker 127 determines gaze direction 121, as shown. Preferably, eye-tracker determines gaze direction by tracking the structures of the eye. Preferably, gaze direction 121 intersects the plane of display 128 at intersection angle A, as shown. Preferably, display 128 is positioned a known distance L from eye 125, as shown. Preferably, the portion of the display being viewed by foveal-vision can be estimated by calculating using average diameter F of fovea centralis 126, distance L, and intersection angle A, by using geometric and trigonometric formulas well known in the art. Preferably, such a formula would determine the diameter D of the area approximating the foveal-vision of the user, as shown. Alternately preferably, the visual field can be pre-determined, such as, for example, 2 degrees, 5 degrees, or 10 degrees, etc. Alternately preferably, the visual field can be pre-determined for the user by testing the user's central vision, for example, by displaying test patterns. Preferably, a predetermined visual field can be stored as a user preference or, alternately preferably, stored in a database, for example, user preference information may be stored in a connected PACS database or other external database.

Alternately preferably, the portion of the display being viewed by foveal-vision can be tracked directly by directly resolving fovea centralis 126. Preferably, the fovea-tracking device will emit a certain wavelength of light to resolve the fovea centralis 126. Preferably, the fovea-tracking device will detect light reflected from the eye, including information needed to resolve fovea centralis 126. Preferably, the fovea-tracking device will map the fovea to a portion of display 128. Preferably, distance L and angle A may vary, and the system will support determining these values as the user moves relative to the display 128. Alternately preferably, the portion of the display being viewed by foveal-vision can be tracked directly by illuminating a portion of the eye, such as, for example, a portion of the eye including its external structure. Alternately preferably, the size and shape of a user's foveal-vision may be determined by viewing a set of test images, such as, for example, by viewing test patterns having various sizes and shapes to determine what space is bounded by foveal-vision. For the purpose of this application, the term "central vision" can be used interchangeably with "foveal-vision." Preferably, the foveal-vision refers to the region of central vision in which a user can perceive at high resolution which may be greater or smaller than the region that anatomically maps to the user's fovea.

Figure 3:
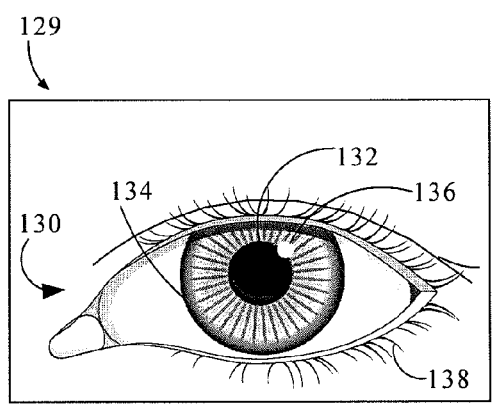
FIG. 3 shows a front view illustrating an image of a user's eye, as captured by an eye tracking device, according to another preferred embodiment of the present invention.

FIG. 3 shows a front view illustrating an image of a user's eye, as captured by an eye-tracking device, according to another preferred embodiment of the present invention. Preferably, an eye-tracker collects user's eye-image 129. Preferably, the eye tracker identifies the various features of eye 130, including, for example, pupil 132, iris 134, and eyelashes 138. Preferably, eye tracker 102 also distinguishes patterns, such as glint 136, which is not a feature of the eye, but a light reflection from the anterior structures (glint 136). Preferably, eye tracker 102 also distinguishes reflections from the posterior structures of the eye, such as, for example, the retina. Preferably, eye tracker 102 determines the direction of user 108 vision by using one or more of these features. Upon reading the teachings of this specification, those with ordinary skill in the art, will now understand that, under appropriate circumstances, considering issues such as imaging technology, user preference, economic considerations, advances in mathematics, computer technology, etc., other types of foveal-vision determiners, and other methods for tracking the fovea or user's gaze, such as head-trackers, scene camera plus eye camera, laser tracking, infrared illuminating trackers, etc., may suffice. (At least embodying herein "foveal-vision determining means"; or at least alternately embodying herein "illuminating means for illuminating at least one portion of the eye of at least one user and imaging means for imaging at least one portion of the eye of at least one user"; or at least alternately embodying herein "at least one illuminator to illuminate at least one portion of the eye of at least one user; and at least one imager to image at least one portion of the eye of at least one user"; or at least alternately embodying herein "illuminating at least one portion of the eye of at least one user and imaging the at least one portion of the eye of at least one user"; or at least alternately embodying herein "foveal-vision determining means for determining the space bounded by the foveal-vision of at least one user"; or at least alternately embodying herein "at least one foveal-vision determiner structured and arranged to determining the space bounded by the foveal-vision of at least one user"; or at least alternately embodying herein "at least one foveal-vision determiner to determine the space bounded by the foveal-vision of at least one user"; or at least alternately embodying herein "determining the space bounded by the foveal-vision of at least one user.") (At least embodying herein "at least one calculator to calculate the space bounded by the foveal-vision of at least one user"; or at least alternately embodying herein "calculating means for calculating the space bounded by the foveal-vision of at least one user"; or at least alternately embodying herein "calculating the space bounded by the foveal-vision of at least one user.)

Figure 4:
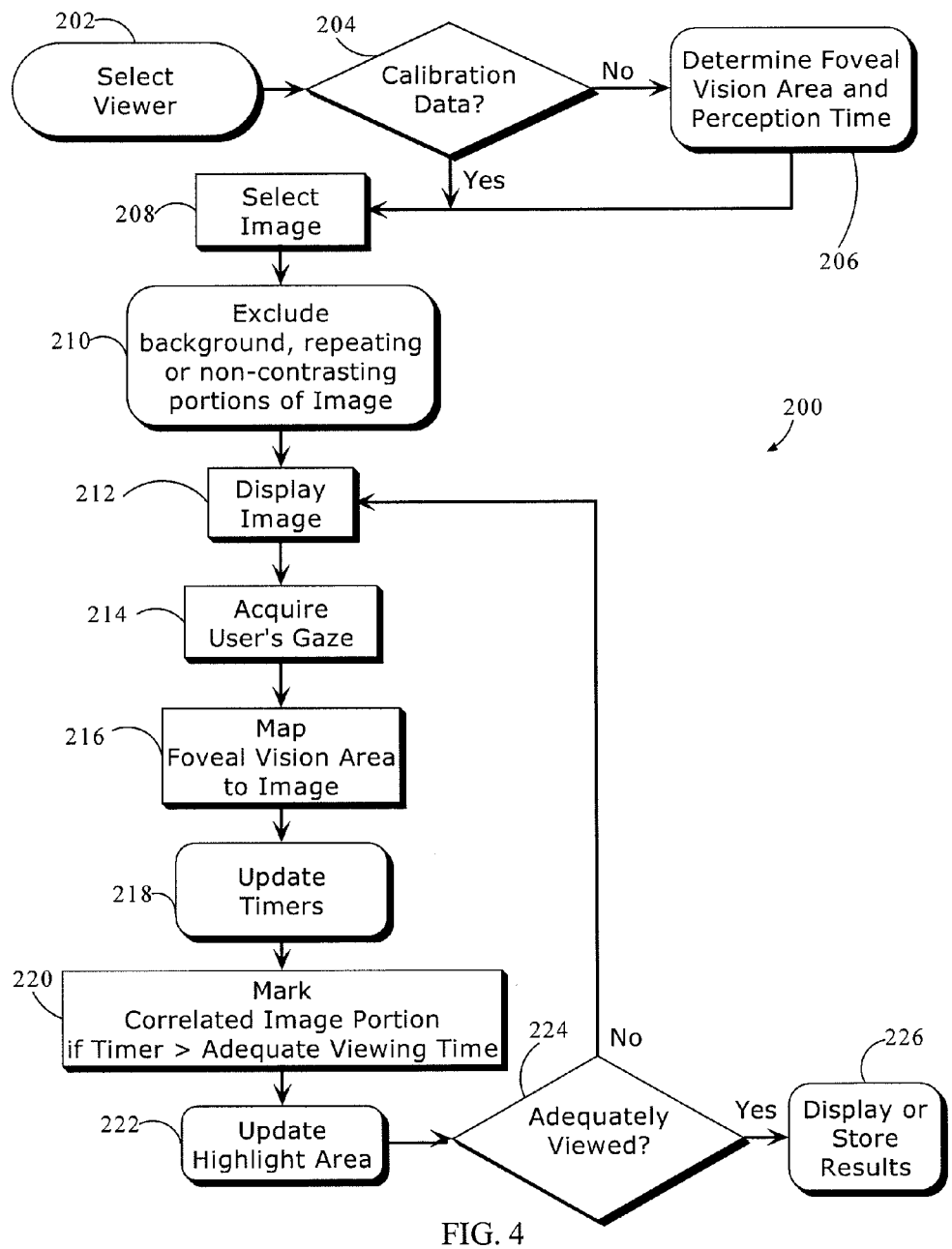
FIG. 4 shows a flowchart view illustrating the process of verifying viewing according to another preferred embodiment of the present invention.

FIG. 4 shows a flowchart view illustrating the process of verifying viewing according to another preferred embodiment of the present invention. The process for viewing verification 200 comprises various steps. Preferably, step 202 may comprise a user login or selection of a user profile. Preferably, process for viewing verification 200 determines whether the selected user profile has associated calibration data during step 204. Preferably, if no calibration data exists, process for viewing verification 200 optionally determines the necessary calibration data during step 206. Preferably, process for viewing verification 200 determines the size and shape of the foveal-vision area by testing the vision of the user during step 206. Preferably, process for viewing verification 200 determines the minimum time for adequately viewing by testing the vision of the user during step 206. Alternately preferably, the user may predetermine the foveal-vision area and/or minimum time for adequately viewing. Preferably, during step 206, the calibration information is stored in association with the user's profile for later uses. Preferably, process for viewing verification 200 allows the user to select an image for viewing during step 208. (At least embodying herein "at least one calibrator to calibrate at least one foveal-vision determiner"; or at least alternately embodying herein "at least one calibrator to calibrate at least one foveal-vision determiner"; or at least alternately embodying herein "calibrating means for calibrating foveal-vision determining means".)

Preferably, during step 210, process for viewing verification 200 optionally determines the meaningful portion of the selected image. Preferably, the meaningful portion of the image is determined by programmatically excluding portions of the image that do not require viewing. Preferably, step 210 will identify background portions of the image and exclude them from the meaningful portion. Preferably, step 210 will determine repeating portions of images and excluding them from the meaningful portion. Preferably, step 210 will identify non-contrasting portions of the images, such as all-black, all-white, or other homogenous colored portions of the image and exclude them from the meaningful portion. Preferably, step 210 may determine other background portions of the image, such as, for example, portions of the image that may be attributed to the image-scanning device. Preferably, the user may optionally assist step 210 by indicating background areas or other areas that need not be viewed. Preferably, the user may optionally assist step 210 by including portions of the selected image which otherwise would be programmatically excluded. Preferably, step 210 will consider any of these factors singly or in any combination. Preferably, portions of the image that the user indicates are not meaningful are predetermined portions.

Preferably, during step 212, process for viewing verification 200 will display the selected image on a display device. Preferably, during step 212, the user may modify the display of the image, including the ability to change image magnification, change the grayscale or color map used to render the image, and pan to regions of images that may be outside the of the display. Preferably, during step 214, process for viewing verification 200 will receive the location of the foveal-vision from the eye-tracking device. Preferably, during step 216, process for viewing verification 200 will correlate the location of the foveal-vision to the portion of the image being displayed. (At least embodying herein "at least one correlater to correlate"; or at least alternately embodying herein "correlating means for correlating".)

Preferably, during optional step 218, process for viewing verification 200 will determine the relevant timers for the portion of the image that is presently correlated to the foveal-vision of the user and will update these timers (At least embodying herein "at least one timer to time the duration of the"). (At least embodying herein "timing means for timing"; or at least alternately embodying herein "at least one timer to time"; or at least alternately embodying herein "timing whether the duration of the correlation.)

Alternately preferably, during step 220, process for viewing verification 200 will mark the correlated portion of the image adequately viewed. Alternately preferably, during step 220, process for viewing verification 200 will test each updated timer to verify whether the total time viewing exceeds the user's minimum time to adequately view. Preferably, if the viewing time exceeds the user's minimum time to adequately view, the related portion of the image will be marked as adequately viewed. Preferably, during optional step 222, process for viewing verification 200 will update the display by highlighting the portion of the image which has been marked adequately viewed. Preferably, the user may toggle highlighting on and off as desired. Preferably, the user may store highlighting preference with the user's profile.

Preferably, during step 224, unless the user indicates that he is finished viewing, the cycle will repeat. Preferably, during step 224, process for viewing verification 200 will check each portion of the foveal-vision correlation data to ascertain whether the entire meaningful portion of the image has been adequately viewed, as shown. (At least embodying herein "verifying means for verifying"; or at least alternately embodying herein "at least one verifier to verify"; or at least alternately embodying herein "verifying means for verifying.") Preferably, during step 224, process for viewing verification 200 may optionally indicate if the user attempts to finish viewing before all meaningful portions of the image have been marked adequately viewed. Preferably, during step 224, process for viewing verification 200 will notify the user when the meaningful portions of the image have been adequately viewed, such as by visual or audio signal. Preferably, during optional step 226, the verification results of the viewing are stored for later reporting or verification. Preferably, during step 226, such verification results may include timer information, eye movement information, portions excluded from the meaningful portion, and any other related information.

Preferably, during step 226, the information may be recorded in a database, for example a PACs database or other information system. Upon reading the teachings of this specification, those with ordinary skill in the art, will now understand that, under appropriate circumstances, considering issues such as imaging technology, user preference, economic considerations, advances in technology, etc., other types of databases, may suffice. (At least embodying herein "retrieving means for retrieving at least one medical image from at least one database"; or at least alternately embodying herein "saving means for saving at least one result of verifying viewing of at least one medical image into at least one database"; or at least alternately embodying herein "at least one retriever to retrieve at least one medical image from at least one database"; or at least alternately embodying herein "at least one saver to save at least one result of verifying viewing of at least one medical image into at least one database"; or at least alternately embodying herein "retrieving at least one medical image from at least one database"; or at least alternately embodying herein "saving the at least one result of verifying viewing of at least one medical image into at least one database.")

Figure 5:
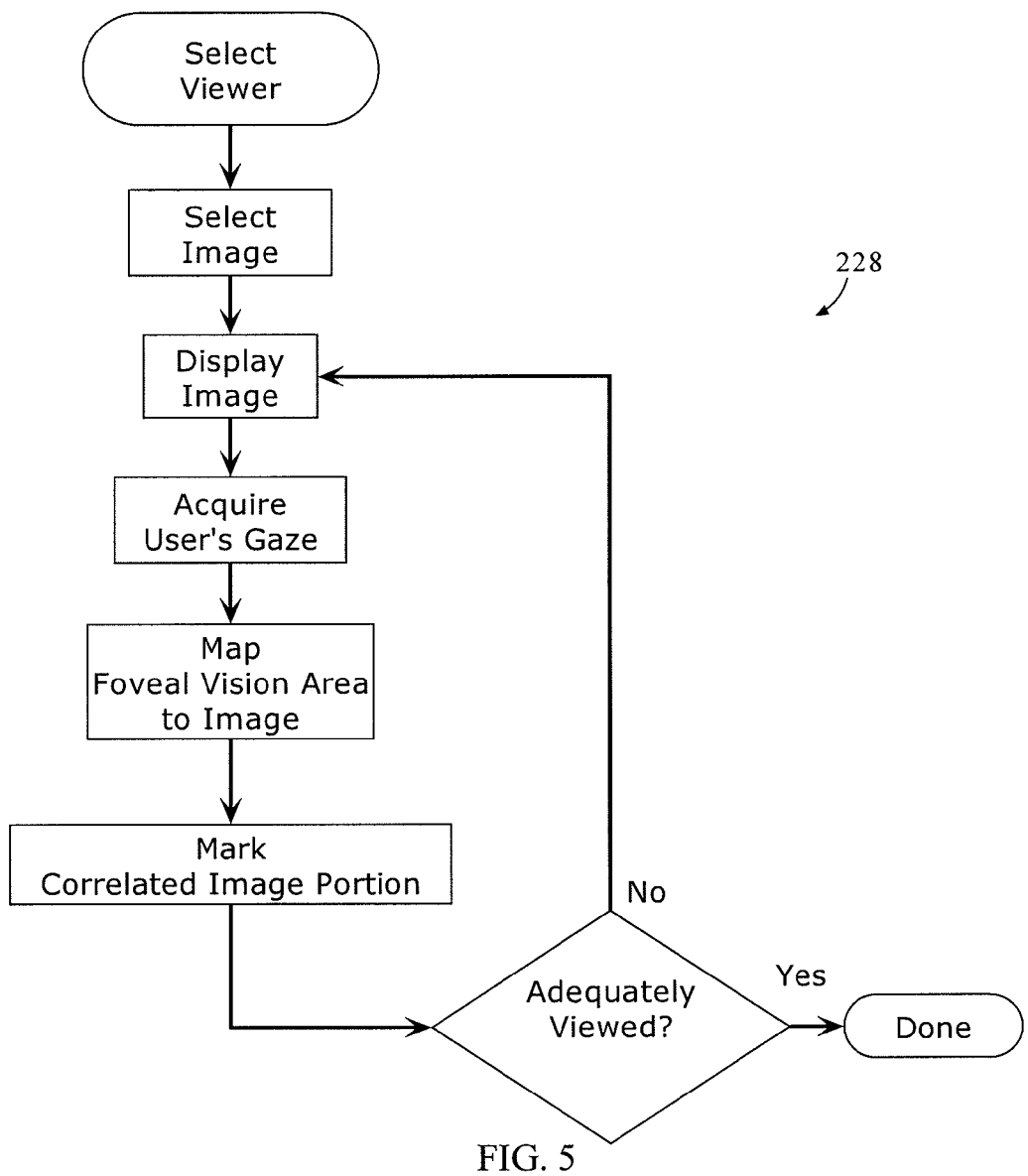
FIG. 5 shows a flowchart view illustrating a similar process of verifying viewing according to another preferred embodiment of the present invention.

FIG. 5 shows a flowchart view illustrating the process of verifying viewing according to another preferred embodiment of the present invention. Preferably, viewing verification system 228 comprises only the preferred, non-optional steps of viewing process for viewing verification 200.

Figure 6:
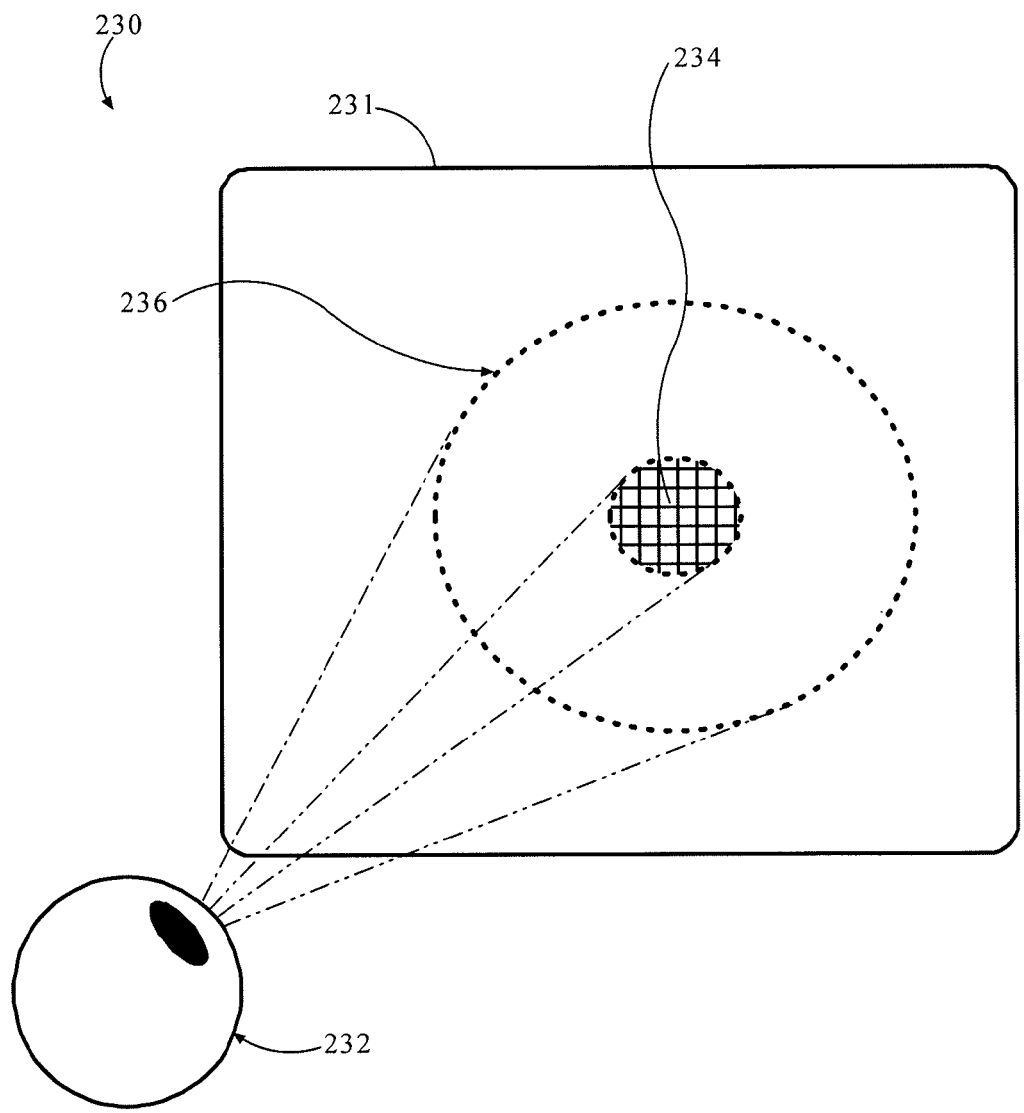
FIG. 6 shows a diagrammatic view illustrating foveal-vision projected onto a display according to another preferred embodiment of the present invention.

FIG. 6 shows a diagrammatic view illustrating foveal-vision projected onto a display according to another preferred embodiment of the present invention. Preferably, viewing verification system 230 comprises display 231. Preferably, eye 232 of the user of viewing verification system 230 gazes at display 231, as shown. Preferably, viewing verification system 230 can determine area 234 correlating to foveal-vision, as shown. Preferably, viewing verification system 230 can distinguish area 234 correlating to foveal-vision from other area 236 of peripheral vision, as shown.

Figure 7:
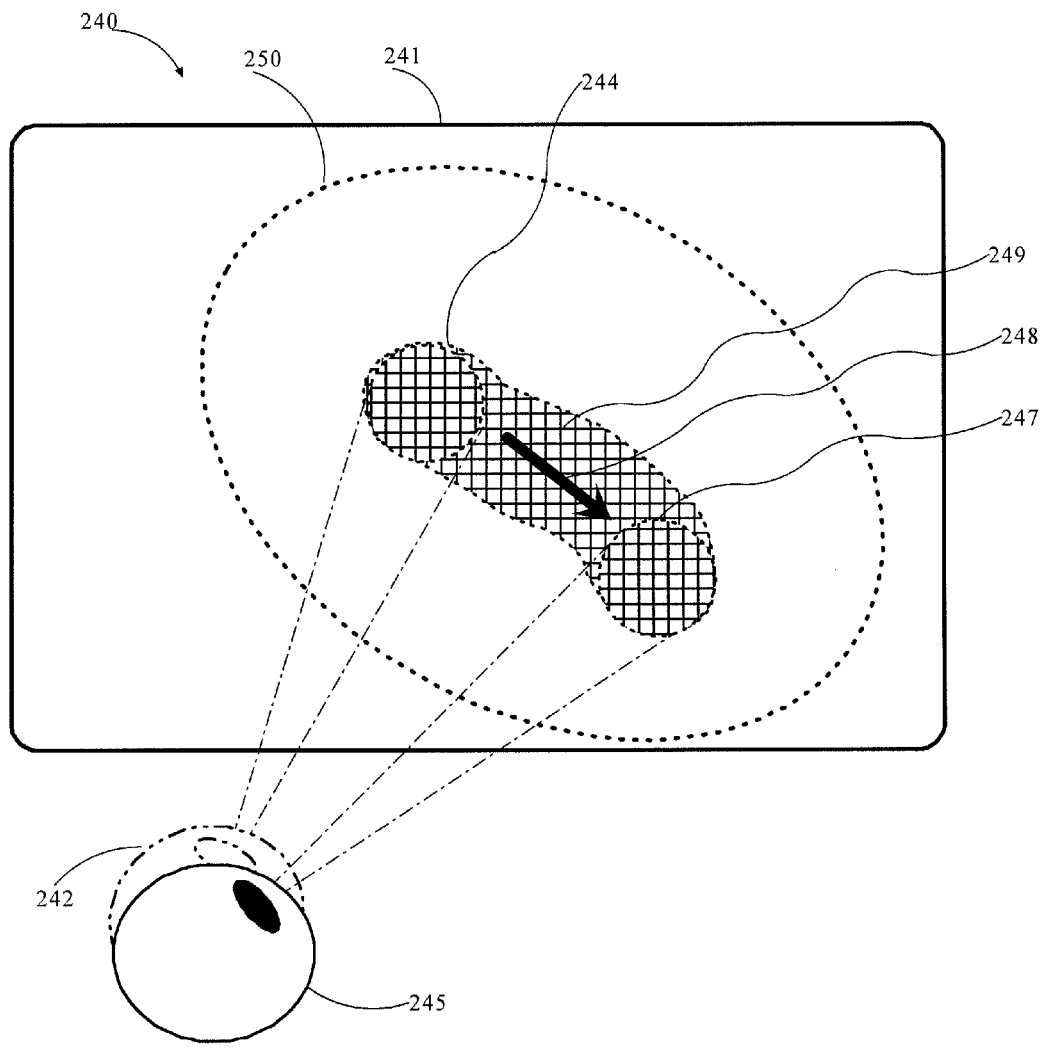
FIG. 7 shows a diagrammatic view illustrating tracking foveal-vision as an eye scans across a display according to another preferred embodiment of the present invention.

FIG. 7 shows a diagrammatic view illustrating tracking foveal-vision as an eye scans across a display according to another preferred embodiment of the present invention. Preferably, viewing verification system 240 comprises display 241. Preferably, eye 242, at a first point in time, gazes at display 241, as shown. Preferably, viewing verification system 240 correlates the gaze of eye 242 to area 244 on display 241, as shown. Preferably, viewing verification system 240 correlates the gaze of eye 245, at a second point of time, to area 247, as shown. Preferably, viewing verification system 240 correlates area 248 to the gaze of the eye as it moves along the path indicated by arrow 248 between such first point in time and such second point in time, as shown.

Figure 8:
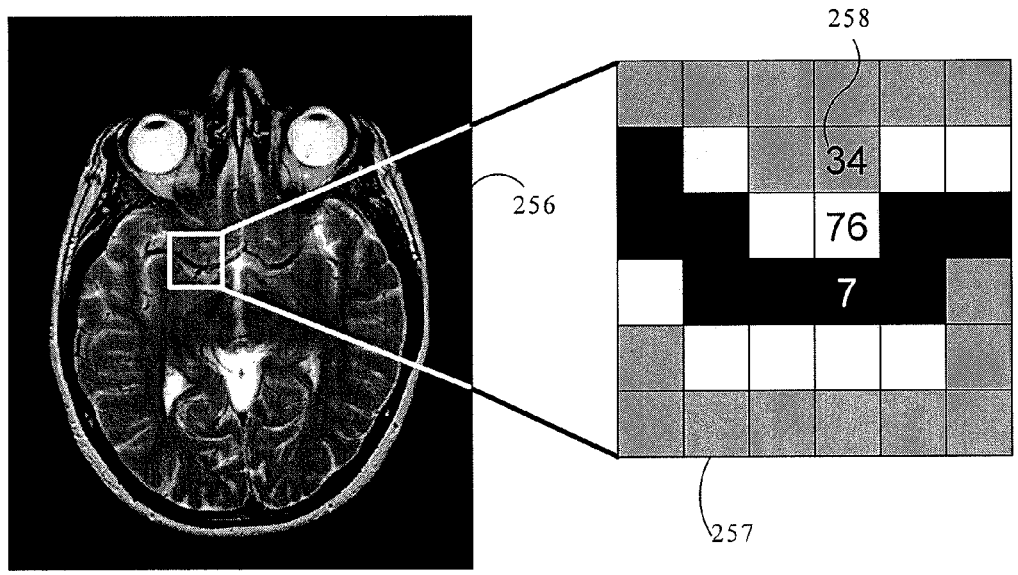
FIG. 8 shows a view illustrating an axial T2 weighted MRI image of the brain as displayed according to another preferred embodiment of the present invention.

FIG. 8 shows a view illustrating an axial T2 weighted MRI image of the brain as displayed according to another preferred embodiment of the present invention. Pixel subset 257 is a magnified subset of digital image 256 for purposes of illustration and discussion. (At least embodying herein "encoding means for encoding"; or at least alternately embodying herein "at least one encoder to encode.") Preferably, digital image 256 comprises an axial T2 weighted MRI image of the brain, as shown. Preferably, digital image 256 comprises a two-dimensional array of pixels (picture elements), where each pixel has numerical values 258. Alternately preferably, digital image 256 could be a series of two-dimensional images that vary in spatial position, time or projection, a three-dimensional imaging volume composed of volume elements (voxels), a four-dimensional imaging volume consisting of a series of three-dimensional imaging volumes obtained at different points in time, etc. In this example, digital image 256 comprises an array with 512 pixels along the X-axis and with 512 pixels along the Y-axis, as shown. Preferably, for the purpose of image display, numerical values 258 of the pixels are displayed as shades of gray or various colors, as shown. For example, numerical values 258 are displayed as shades of gray, where low numbers are mapped toward the black end of the brightness scale and high numbers are mapped toward the white end of the brightness scale, as shown. Preferably, pixel subset 257 illustrates a portion of such a two-dimensional pixel arrays, as shown. Pixel subset 257 shows numerical values 258 for three pixels.

Figure 9:
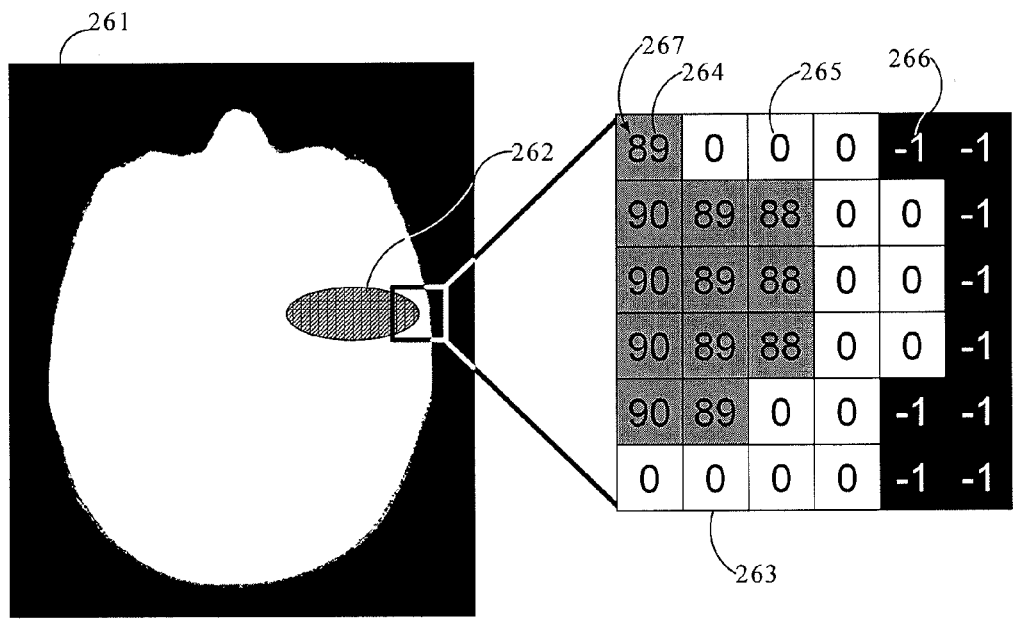
FIG. 9 shows a diagrammatic view illustrating a foveal-vision correlation data structure tracking the axial T2 weighted MRI image of FIG. 8.

FIG. 9 shows a diagrammatic view illustrating a foveal-vision correlation data structure tracking the axial T2 weighted MRI image of FIG. 8. Pixel subset 263 comprises a magnified subset of data structure 261 for purposes of illustration and discussion. Preferably, the foveal-vision correlation data structure 261 used to track pixels that have been adequately viewed by foveal-vision is similar to the corresponding image being viewed, as shown. (At least embodying herein "encoding means for encoding"; or at least alternately embodying herein "at least one encoder to encode".) Preferably, area 262 represents a portion of the image that has been correlated to foveal-vision, as shown. Preferably, foveal-vision correlation data structure 261 comprises a two-dimensional array of numerical values 267, as shown. Preferably, numerical values 267 comprise values that encode foveal-vision correlation information, as shown. Alternately preferably, numerical values 267 may also encode pixels that are relevant for viewing, as shown, with non-meaningful regions displayed in black, meaningful but inadequately viewed pixels displayed in white, and meaningful adequately viewed pixels displayed in grey (which corresponds to the hatch pattern of area 262). Alternately preferably, separate arrays may be kept for encoding foveal-vision correlation information and encoding relevancy information that contains meaningful, relevant pixels that need to be viewed. Preferably, numerical values 267 comprise values representing adequately viewed pixels 264, values representing inadequately viewed pixels 265, and values representing irrelevant pixels 266, as shown. Preferably, foveal-vision correlation data structure 261 maps to digital image 256, as shown. Preferably, foveal-vision correlation data structure 261 maps to digital image 256, pixel by pixel. Preferably, pixel subset 263 illustrates how numerical information encodes such information. Preferably, pixel subset 263 illustrates how these values can be displayed as grayscale information, as shown.

Preferably, foveal-vision correlation data structure 261 may contain areas of the image that need not be viewed, which are illustrated in black in digital image 256 and foveal-vision correlation data structure 261. Preferably, values representing irrelevant pixels 266 are encoded with values of negative one (−1), as shown. Preferably, values representing irrelevant, non-meaningful pixels 266 may be determined through automated means. Preferably, values representing irrelevant pixels 266 may be determined by simple image thresholding, for example, using values representing irrelevant pixels 266 (At least embodying herein "encoding means for encoding such"; or at least alternately embodying herein "at least one encoder to encode".) for all pixels that fall below a chosen numerical value, as shown. In the figures, pixels are encoded as negative one (−1) are illustrated in black, as shown. Preferably, values representing inadequately viewed pixels 265 are encoded as zero (0), as shown.

For the purposes of this application, "meaningful portion" shall mean the image less the portions excluded. Upon reading the teachings of this specification, those with ordinary skill in the art, will now understand that, under appropriate circumstances, considering issues such as imaging technology, user preference, economic considerations, advances in technology, advances in fractal mathematics, etc., other types of methods of determining the meaningful, relevant portion of an image, for example, identifying repeating portions of document, identifying empty space between luggage, region growing, detecting regions of homogeneous intensity over a portion of an image, detecting regions that fall within a range of intensities, etc., may suffice. (At least embodying herein "distinguishing means for distinguishing"; or at least alternately embodying herein "at least one distinguisher to distinguish.")

Preferably, values representing adequately viewed pixels 264 are encoded using the number of milliseconds of continuous time that foveal-vision has intersected with the corresponding pixels in digital image 256, as shown. For example, pixel subset 263 of foveal-vision correlation data structure 261 illustrates that the grey colored pixels have been viewed for between 88-90 milliseconds, as shown. Alternately preferably, values representing adequately viewed pixels 264 could be encoded with a single value, or a value representing a particular color useful for contrast inverting the image, as explained infra.

FIG. 10 shows a view illustrating an axial T2 weighted MRI image of the brain as displayed according to another preferred embodiment of the present invention. Preferably, digital image 270 comprises an axial T2 weighted MRI image of the brain.

FIG. 11 shows a diagrammatic view illustrating a data structure representing the irrelevant, homogeneous portions of the axial T2 weighted MRI image of the brain of FIG. 10. Preferably, relevant data structure 272 comprises information encoded such that it may display relevant pixels in white and irrelevant pixels in black, as shown. Preferably, a user of a viewing verification system need not adequately view irrelevant pixels in order for the viewing verification system to determine that an image has been completely adequately viewed. Preferably, the viewing verification system will exclude irrelevant pixels from any analysis of whether substantially the entire meaningful portion of an image has been adequately viewed.

FIG. 12 shows a diagrammatic view illustrating a foveal-vision correlation data structure of the axial T2 weighted MRI image of the brain of FIG. 10. Preferably, foveal-vision correlation data structure 274 comprises irrelevant portions that are illustrated as black, relevant, unviewed portions that are illustrated in white, and area 276 representing a portion of the image that has been adequately viewed, as shown.

FIG. 13 shows a view illustrating an image nearly identical to FIG. 10, except that the area that has been adequately viewed, as shown by the foveal-vision correlation data structure of FIG. 12, is contrast inverted. Preferably, digital image 278 illustrates the result of contrast inverting the portion of digital image 270 corresponding to area 276 of foveal-vision correlation data structure 274, as shown. Preferably, this exemplifies one method of indicating to the user which portions of the image have been adequately viewed, and which portions of the image remain to be viewed adequately. Alternately preferably, different colors or overlays could be used to allow the user to easily differentiate between adequately viewed meaningful regions, inadequately viewed meaningful regions, and non-meaningful regions.

Preferably, during the process of viewing, the user may desire a visual representation of the portions of the image have been adequately viewed with foveal-vision. Preferably, the user may indicate their intention by a mouse click or keyboard command. Preferably, digital image 278 illustrates a technique in which the region that has been adequately viewed is displayed in area 279 with inverted contrast, as shown. Preferably, foveal-vision correlation data structure 274 has a structure that is substantially parallel to digital image 270, easily enabling those skilled in the art to highlight the portion of digital image 270 relating to area 276, as shown.

Upon reading the teachings of this specification, those with ordinary skill in the art, will now understand that, under appropriate circumstances, considering issues such as imaging technology, user preference, economic considerations, advances in technology, advances in mathematics, advances in fractal research, etc., other methods of indicating adequately viewed portions of an image, such as highlighting text, using colors, using imaging filters, etc., may suffice.

Figure 14:
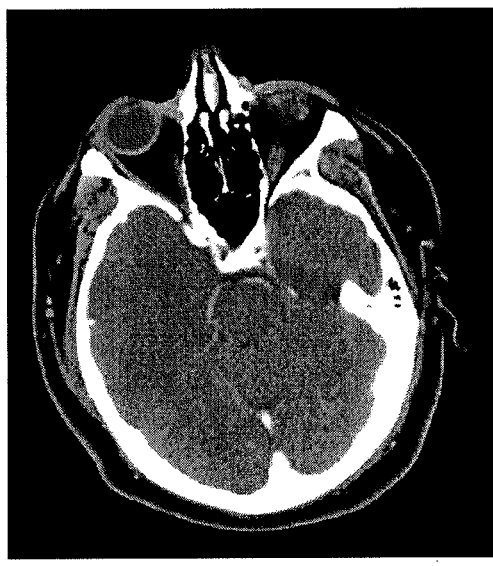
FIG. 14 shows a view illustrating a computed tomography (CT) image of a brain, using a grayscale map known as "brain windows," as displayed according to another preferred embodiment of the present invention.

FIG. 14 shows a view illustrating a computed tomography (CT) image of a brain using a grayscale map known as "brain windows," as displayed according to another preferred embodiment of the present invention. Preferably, digital image 290 comprises a brain CT image being displayed using "brain windows," as shown.

Figure 15:
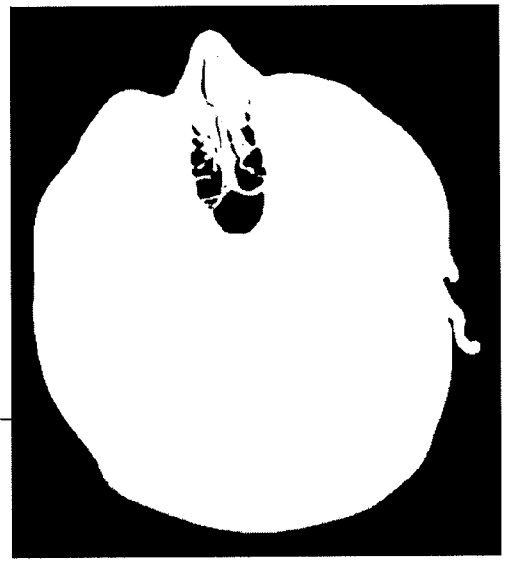
FIG. 15 shows a diagrammatic view illustrating a foveal-vision correlation data structure related to the image shown in FIG. 14, according to the preferred embodiment of FIG. 14.

FIG. 15 shows a diagrammatic view illustrating a foveal-vision correlation data structure related to the image shown in FIG. 14, according to the preferred embodiment of FIG. 14. Preferably, foveal-vision correlation data structure 292 comprises information about each pixel of digital image 290, as shown. Alternately preferably, foveal-vision correlation data structure 292 comprises information about relevant, meaningful portions of the related grayscale map, as shown. Preferably, each pixel is encoded with a particular color (shown as black), when it is irrelevant for viewing, as shown. Preferably, each pixel is encoded with a particular color (shown as white), when it is relevant for viewing, as shown.

Figure 16:
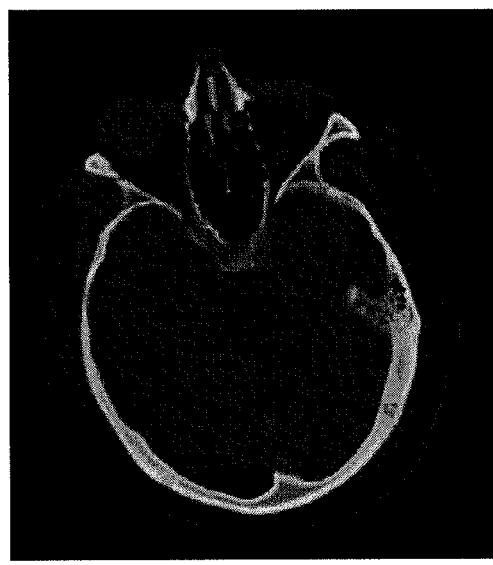
FIG. 16 shows a view illustrating a computed tomography (CT) image of a brain displayed using a grayscale map known as "bone windows," according to the preferred embodiment of FIG. 14.

FIG. 16 shows a view illustrating a computed tomography (CT) image of a brain displayed using a grayscale map known as "bone windows" according to the preferred embodiment of FIG. 14. Preferably, digital image 294 comprises a brain CT image being displayed using the "bone windows," as shown.

Figure 17:
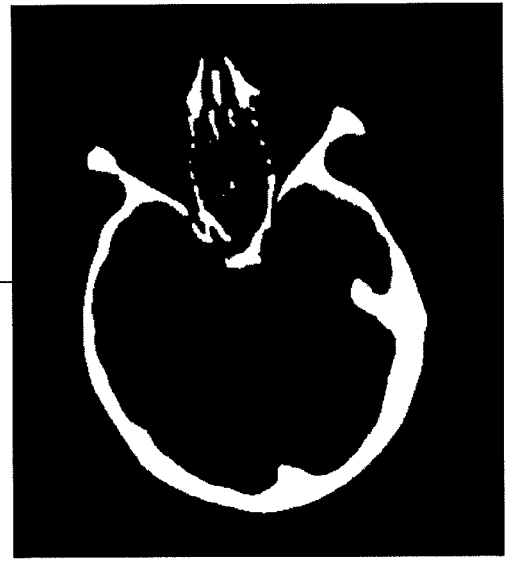
FIG. 17 shows a diagrammatic view illustrating a foveal-vision correlation data structure related to the image of FIG. 16, according to the preferred embodiment of FIG. 14.

FIG. 17 shows a diagrammatic view illustrating a foveal-vision correlation data structure related to the image of FIG. 16, according to the preferred embodiment of FIG. 14. Preferably, foveal-vision correlation data structure 296 comprises information about each pixel of digital image 294, as shown. Alternately preferably, foveal-vision correlation data structure 296 comprises information about relevant, meaningful portions of the related "windows", as shown Preferably, each pixel is encoded with a particular color (shown as black), when it is irrelevant for viewing, as shown. Preferably, each pixel is encoded with a particular color (shown as white), when it is relevant for viewing, as shown.

Referring to FIG. 14, FIG. 15, FIG. 16 and FIG. 17, some medical imaging techniques preferably produce images that need to be viewed with multiple display settings to be adequately viewed, because the dynamic range of information is greater than can be appreciated with a single grayscale image. Preferably, these techniques may be broadly applied to nonmedical imaging, such as airport security scanners, where images with several different grayscale or color maps may optimize visual appreciation of information in the images. Preferably, computed tomography (CT) images are viewed using multiple display settings. Preferably, images displayed using "brain windows" might utilize a window level of 40 and window width of 80, resulting in pixel values of 0 and below to be mapped to black in the display, pixel values of 80 and above mapped to white, and values between 0 and 80 mapped across the grayscale of black to white, as shown in FIG. 14. Preferably, this arrangement allows the user to appreciate abnormalities in signal within the brain tissues, which corresponds to that numeric range. Image display with "brain windows" may not allow detection of pathology within bone tissue, which normally has much higher CT values. Preferably, bone tissue appears solid white when displayed in an image displayed using "brain windows", as shown in FIG. 14.

Preferably, to aid detection of pathology in bone, the same CT image is displayed using "bone windows" using a window level of 1,000 and window width of 3,000, as shown in FIG. 16. Preferably, this arrangement allows the user to detect fractures and other abnormalities in bone that would be undetectable with "brain windows."

Preferably, for some regions of anatomy, more than two CT display settings may be required to adequately view the CT image. Preferably, a CT image of a chest may require four display settings: "lung windows," "mediastinal windows," "bone windows," and "liver windows." Preferably, viewing images using such "windows" enhances the perceptibility of the image. Upon reading the teachings of this specification, those with ordinary skill in the art, will now understand that, under appropriate circumstances, considering issues such as imaging technology, user preference, economic considerations, advances in technology, etc., other image enhancer methods of enhancing images, such as computer assisted abnormality detectors, computer aided diagnosis systems (CAD), using color maps instead of grayscale maps, etc., may suffice. (At least embodying herein "enhancing means for enhancing"; or at least alternately embodying herein "at least one enhancer to enhance".)

Preferably, when medical images require viewing with more than one display setting, each display setting will relate to a foveal-vision correlation data structure, as shown. Preferably, digital image 290 has related foveal-vision correlation data structure 292 for displaying the CT image using "brain windows," as shown. Preferably, digital image 294 has related foveal-vision correlation data structure 296 for displaying the CT image using "bone windows," as shown.

Preferably, relevant, meaningful, regions which require viewing will vary depending on the image display setting's parameters, as shown in FIG. 14 and FIG. 15, and also in FIG. 16 and FIG. 17. Preferably, simple image thresholding may be used to distinguish between relevant and irrelevant portions of the image. Preferably, the black, irrelevant portions of FIG. 15 may be derived by simple image thresholding of FIG. 14, as shown. Preferably, the black, irrelevant portions of FIG. 17 may be derived from FIG. 16 using simple image thresholding, as shown. Preferably, the threshold value was low for "brain windows" and high for "bone windows," as shown. Alternately preferably, other methods of image segmentation could be used to distinguish between meaningful and non-meaningful regions or volumes within an imaging dataset.

Preferably, when tracking the viewing of images, the viewing verification system tracks the viewing of the entire imaging data set (e.g. all of the "windows", all of the slices, etc.). Preferably, the viewing verification system does not require the user to adequately view the first image of a set of images before moving to the next. Preferably, a user could scan through a set of images in an exam multiple times, directing attention to different regions. For example, consider a CT angiogram (CTA) of a patient's neck, a series of adjacent CT scans through a patient's neck in which the arteries are opacified via the intravenous injection of iodinated contrast. This neck CTA would consist of a series of cross sectional images that cover the four important arteries in the neck, the left carotid artery, the right carotid artery, the left vertebral artery, and the right vertebral artery.

For example, in viewing such an exam, the typical reader might not completely examine each image before navigating to another image. Instead, the user might choose a vessel, for example the left carotid artery, and scroll up and down through the set of images, carefully observing the left carotid artery, looking for changes in vessel caliber from slice to slice that would indicate an area of stenosis. After the user was satisfied that he had thoroughly examined the left carotid artery, he would then repeat the process for each of the additional vessels. In addition, he would use a similar process to examine the spine, the airway, and the soft tissue structures of the neck, such as the thyroid gland, salivary glands, lymph nodes, etc. The viewing verification system would preferably track the parts of the images that he had adequately examined as he scrolled up and down through the data. The viewing verification system would preferably provide feedback to the user by indicating which areas had not been adequately viewed. Furthering this example, the viewing verification system might preferably indicate that the region of the left vertebral artery in the images had not yet been adequately viewed.

Another example would be the viewing of a series of images over time. Consider a dynamic MRI consisting of a series of 3D acquisitions covering the breast with parallel images covering the breast at contiguous spatial positions. This acquisition might be repeated 10 times, with one set before contrast administration and the remaining 9 at different times following contrast administration. Therefore a four dimensional dataset is collected. By viewing a set of images obtained at each spatial location across time, a radiologist can assess the contrast enhancement pattern of the tissues within the breast in order to differentiate between normal tissue, benign lesions, and cancerous lesions. Thus, the radiologist may prefer to view images at specific slice position obtained at the various times before moving to another slice position. Preferably, the viewing verification system tracks the viewing of the images, regardless of the order of viewing in space or time.

As a further example, an imaging exam may require that the image be displayed at full resolution, with a display setting of magnification factor IX or above, where 1× indicates that pixels in the image are displayed with a one to one mapping to the display screen. As an alternate example, other image exams may require that the image be displayed with a display setting of magnification factor of at least 0.5×, where every other pixel is displayed in each dimension, so only one-quarter of the pixels are displayed. Preferably, the viewing verification system may require viewing at a predetermined magnification setting, above a minimum magnification setting, etc. Preferably, at magnifications of less than 1× (i.e. that is minification), important details may not be apparent in image because the resolution is inadequate, so preferably, the viewing verification system will not mark portions of the image adequately viewed at inadequate magnifications.

As a final display setting example, some imaging exams are processed to produce 3D images, using surface rendering or volume rendering. In such exams, the voxels that describe the surface of these 3D images are those that would be required to be viewed. Since a distortion in the contour of a 3D surface might not be appreciated when viewed perpendicular to the surface, the viewing verification system may prefer to require the surface to be viewed with a minimum of two different angles, where the angles differ by at least one minimum angle, for example, such as 40 degrees.

For purposes of this application, the term "computed topography (CT) scan" shall mean the set of images generated from a computed topography exam. For purposes of this application, the term "magnetic resonance imaging (MRI) scan" shall mean the set of images generated from a magnetic resonance imaging exam. For purposes of this application, the term "positron emission tomography (PET) scan" shall mean the set of images generated from a positron emission tomography exam.

FIG. 18 shows a diagrammatic view illustrating a foveal-vision correlation data structure for a two dimensional image according to another preferred embodiment of the present invention. Examples of such images include medical images, word processing documents, security scan x-rays, security videos or photographs, satellite photography, images viewed by air traffic controllers, computer displays by pilots that may periodically display changes that represent meaningful, critical information, etc. Preferably, two-dimensional image-depicting data 300 comprises information collected while using another preferred embodiment of the present invention. (At least embodying herein "depicting means comprises 2D means for dimensioning at least one set of depictions along at least two spatial dimensions.") Preferably, two-dimensional image-depicting data 300 describes the information collected while viewing a two-dimensional image. Preferably, user identifier data 302 indicates the user that viewed the image. Preferably, image identifier data 304 indicates the image that was viewed.

Preferably, x-axis data 306 contains information describing the location of a portion of an image along the x-axis of the image. Preferably, x-axis data 306 may indicate a specific pixel. Preferably, x-axis data 306 may alternatively describe a range along the x-axis, as long as such range may be contained within the foveal-vision of the user. Preferably, y-axis data 308 contains information describing the location of a portion of an image along the y-axis of the image. Preferably, y-axis data 308 may indicate a specific pixel. Preferably, y-axis data 308 may alternatively describe a range along the y-axis, as long as such range may be contained within the foveal-vision of the user. (At least embodying herein "at least one depicter comprising at least two dimensioners to dimension at least one set of depictions along at least two spatial dimensions"; or at least alternately embodying herein "dimensioning at least one set of depictions along at least two spatial dimensions.")

Preferably, scale data 310 describes the scale or magnification used while viewing the image, thus indicating the level of zoom while viewing. (At least embodying herein "depicting means comprises scaling means for scaling at least one set of depictions"; or at least alternately embodying herein "at least one depicter comprising at least one scaler to scale at least one set of depictions"; or at least alternately embodying herein "scaling means for scaling at least one set of depictions".) Preferably, contrast data 312 describes the contrast, or other grayscale or color display map, used while viewing. (At least embodying herein "depicting means comprises contrasting means for contrasting at least one set of depictions"; or at least alternately embodying herein "at least one depicter comprises at least one contraster to contrast at least one set of depictions"; or at least alternately embodying herein "contrasting means for contrasting at least one set of depictions".) Preferably, timer data 314 indicates the period of time that this portion of the image was viewed. Preferably, meaningful indicator 316 indicates whether the system considered this portion of the image meaningful, that is, all portions of the image except those portions that were excluded. Preferably, adequately viewed indicator 318 indicates whether the system considered this portion of the image completely adequately viewed. Preferably, these data taken together depict a set of two-dimensional images that vary in scale and contrast. Preferably, the system will use two-dimensional image-depicting data 300 when determining if the entire set of images has been adequately viewed.

FIG. 19 shows a diagrammatic view illustrating a foveal-vision correlation data structure for a three dimensional image according to another preferred embodiment of the present invention. Preferably, such an image may be produced with techniques such as volume or surface rendering. Preferably, three-dimensional image-depicting data 400 comprises information collected while using another preferred embodiment of the present invention. (At least embodying herein "depicting means comprises 3D means for dimensioning at least one set of depictions along at least three spatial dimensions"; or at least alternately embodying herein "dimensioning at least one set of depictions along at least three spatial dimensions".) Preferably, user identifier data 402 indicates the user that viewed the image. Preferably, image identifier data 404 indicates the image that was viewed.

Preferably, x-axis data 406 contains information describing the location of a portion of an image along the x-axis of the image. Preferably, x-axis data 406 may indicate a specific pixel. Preferably, x-axis data 406 may alternatively describe a range along the x-axis, as long as such range may be contained within the foveal-vision of the user. Preferably, y-axis data 408 contains information describing the location of a portion of an image along the y-axis of the image. Preferably, y-axis data 408 may indicate a specific pixel. Preferably, y-axis data 408 may alternatively describe a range along the y-axis, as long as such range may be contained within the foveal-vision of the user. Preferably, z-axis data 410 contains information describing the location of a portion of an image along the z-axis of the image. Preferably, z-axis data 410 may indicate a specific pixel. Preferably, z-axis data 410 may alternatively describe a range along the z-axis, as long as such range may be contained within the foveal-vision of the user. (At least embodying herein "at least one depicter comprises at least three dimensioners to dimension at least one set of depictions along at least three spatial dimensions".)

Preferably, rotation data 412 indicates the angle of rotation of the image. (At least embodying herein "depicting means comprises rotating means for rotating at least one set of depictions; at least one depicter comprises at least one rotator to rotate at least one set of depictions"; or at least alternately embodying herein "rotating means for rotating at least one set of depictions.) Preferably, timer data 414 indicates the period of time that this portion of the image was viewed. Preferably, meaningful indicator 416 indicates whether the system considered this portion of the image meaningful, that is, all portions of the image except those portions that were excluded. Preferably, adequately viewed indicator 418 indicates whether the system considered this portion of the image completely adequately viewed. Preferably, these data taken together depict a set of three-dimensional images that vary in rotation and scale. Preferably, the system will use three-dimensional image-depicting data 400 when determining if the entire set of images has been adequately viewed.

FIG. 20 shows a diagrammatic view illustrating a foveal-vision correlation data structure for a four dimensional image, which includes three spatial dimensions and one time dimension, according to another preferred embodiment of the present invention. Preferably, time-dimensional image-depicting data 500 comprises information collected while using another preferred embodiment of the present invention (at least embodying herein depicting means comprises temporal-dimensioning means for dimensioning at least one set of depictions along at least one temporal dimension"; or at least alternately embodying herein "dimensioning at least one set of depictions along at least one temporal dimension.)

Upon reading the teachings of this specification, those with ordinary skill in the art, will now understand that, under appropriate circumstances, considering issues such as advances in technology, new methods of determining foveal-vision, economic considerations, advances in computer programming arts, etc., other methods for depicting images, such as using other data structures, etc., may suffice. (At least embodying herein "depicting means for depicting at least one image"; or at least alternately embodying herein "at least one depicter to depict at least one image as at least one set of depictions".)

Preferably, user identifier data 502 indicates the user that viewed the image. Preferably, image identifier data 504 indicates the image that was viewed. Preferably, x-axis data 506 contains information describing the location of a portion of an image along the x-axis of the image. Preferably, x-axis data 506 may indicate a specific pixel. Preferably, x-axis data 506 may alternatively describe a range along the x-axis, as long as such range may be contained within the foveal-vision of the user. Preferably, y-axis data 508 contains information describing the location of a portion of an image along the y-axis of the image. Preferably, y-axis data 508 may indicate a specific pixel. Preferably, y-axis data 508 may alternatively describe a range along the y-axis, as long as such range may be contained within the foveal-vision of the user. Preferably, z-axis data 510 contains information describing the location of a portion of an image along the z-axis of the image. Preferably, z-axis data 510 may indicate a specific pixel. Preferably, z-axis data 510 may alternatively describe a range along the z-axis, as long as such range may be contained within the foveal-vision of the user. Preferably, time-axis data 512 indicates the timeframe at the time of the imaging. For example, some radiology techniques involve introducing a radiating substance into the body and performing scans during the time that the substance is eliminated from the body, for example, one technique creates images during passage of contrast through tissues after injection or imaging during different phases of the cardiac cycle. Preferably, time-axis data 512 indicates the time intervals of such a technique. (At least embodying herein "at least one depicter comprises at least one temporal-dimensioner to dimension at least one set of depictions along at least one temporal dimension".)

Preferably, filter data 514 indicates any other kind of filter, such as, filtering by color, filtering by grayscale mapping, etc. (At least embodying herein "depicting means comprises coloring means for coloring at least one set of depictions"; or at least alternately embodying herein "at least one depicter comprises at least one colorer to color at least one set of depictions"; or at least alternately embodying herein "coloring means for coloring at least one set of depictions".) Preferably, timer data 516 indicates the period of time that this portion of the image was viewed. (At least embodying herein "timing means for timing"; or at least alternately embodying herein "timing whether the duration of the correlation"; or at least alternately embodying herein "timing the duration of the correlation".)

Preferably, meaningful indicator 518 indicates whether the system considered this portion of the image meaningful, that is, all portions of the image except those portions that were excluded. Preferably, adequately viewed indicator 520 indicates whether the system considered this portion of the image completely adequately viewed. Preferably, these data taken together depict a set of time-dimensional images that vary by filter. Preferably, the system will use time-dimensional image-depicting data 500 when determining if the entire set of images has been adequately viewed.

Upon reading the teachings of this specification, those with ordinary skill in the art, will now understand that, under appropriate circumstances, considering issues such as advances in technology, new methods of eye-tracking, user preference, economic considerations, etc., other methods for depicting images may suffice.

Figure 21:
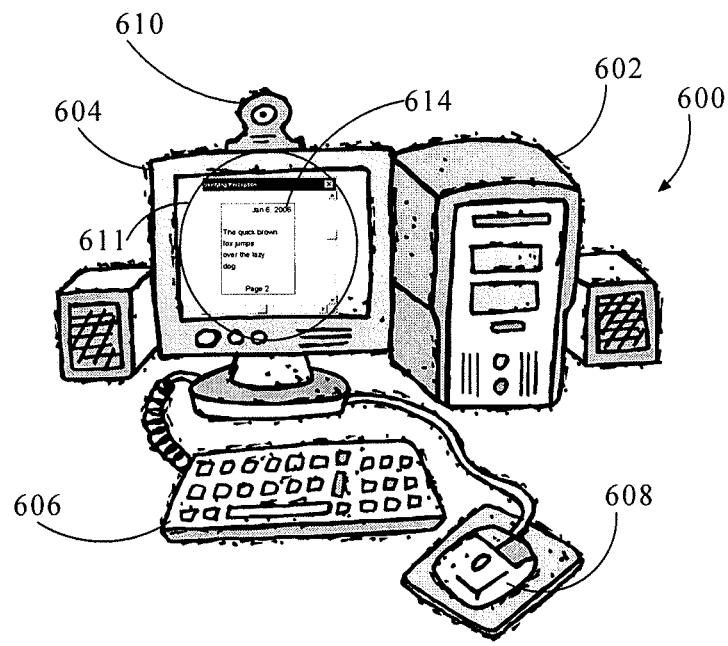
FIG. 21 shows a perspective view illustrating a document verification system according to another preferred embodiment of the present invention.

FIG. 21 shows a perspective view illustrating a document verification system according to another preferred embodiment of the present invention. Preferably, document verification system 600 comprises computer 602, computer display 604, keyboard 606, computer mouse 608, video camera 610, and software 612 (see FIG. 22), as shown. Preferably, software 612 can display document 614 for verification, as shown. Preferably, software 612 accepts input from video camera 610, as shown. Preferably, software 612 calculates the direction of gaze. Preferably, software 612 determines the area bounded by foveal-vision. Preferably, software 612 correlates the area bounded by foveal-vision to the texts 616 of software 612, as shown.

Figure 22:
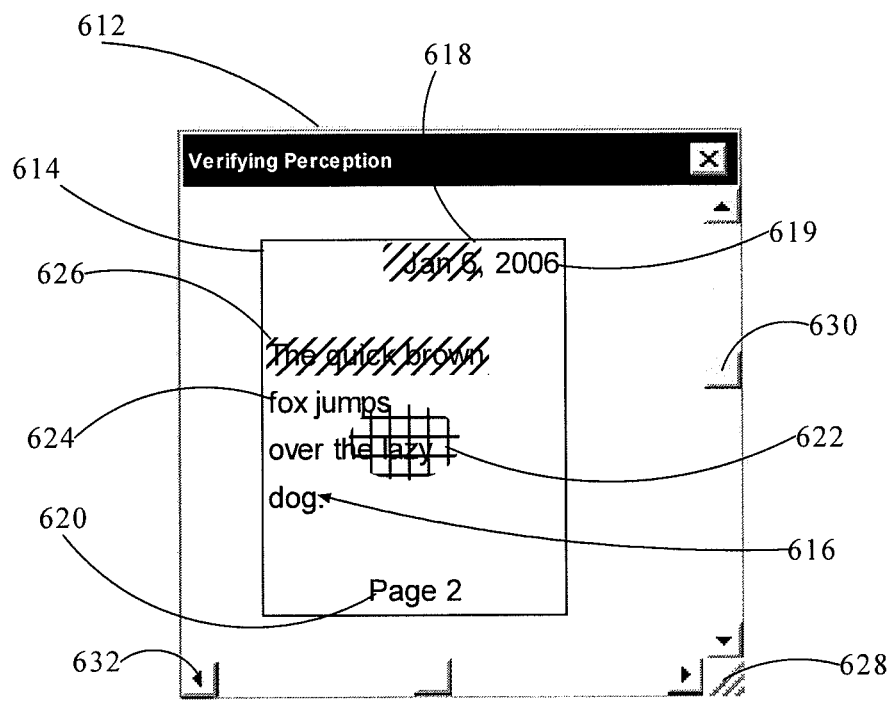
FIG. 22 shows a detailed view of Detail 611 of FIG. 21.

FIG. 22 shows a detailed view of Detail 611 of FIG. 21. Preferably, software 612 is structured and arranged to display document 614, as shown. Preferably, document 614 comprises texts 616, as shown. Preferably, texts 616 comprise header text 619, footer text 620, and body text 624, as shown. Preferably, header text 619 and footer text 620 may repeat in a substantially similar manner on each page of a multi-page document, as shown. Preferably, the date, such as the date shown in header text 619, may repeat exactly on each page, and therefore may not require correlation on more than one page. Preferably, page numbers, such as the page number shown in footer text 620, may repeat in a predictable, automated manner that does not require correlation on more than one page, as shown. Preferably, other repeating texts may not require correlation in more than one page. (At least embodying herein "non-repeating-text determining means"; or at least alternately embodying herein "at least one non-repeating-text determiner"; or at least alternately embodying herein "determining at least one non-repeating portion".)

Preferably, software 612 correlates the foveal-vision to an area 622 on document 614, as shown. Preferably, after the gaze of the user passes over correlated text 618 of header text 619, software 612 marks correlated text 618 as correlated, as shown. Preferably, software 612 can display correlated text 618 as optionally highlighted on the screen, to provide the user with a visual indication of what has been adequately viewed, and what has not been adequately viewed, as shown. Preferably, after software 612 marks correlated text 618 as correlated on one page, software 612 will mark this text as correlated on all other pages because the same text repeats on each page. Preferably, after the gaze of the user passes over correlated text 626 of body text 624, software 612 marks correlated text 626 as correlated, as shown. Preferably, because body text 624 does not repeat anywhere in the document each portion of body text 624 must be correlated separately. Preferably, software 612 comprises scroll button 630, scroll arrows 632 and resize thumb 628, as shown. Preferably, the user can manipulate the scroll button 630 to scroll to different portions of the document, thereby facilitating viewing the entire document. Preferably, the user can also manipulate the scroll arrows 632 to scroll the document. Preferably, the user can zoom and shrink the document using the resize thumb 628 to see more of the document, or less of the document, thereby facilitating viewing the entire document.

Figure 23:
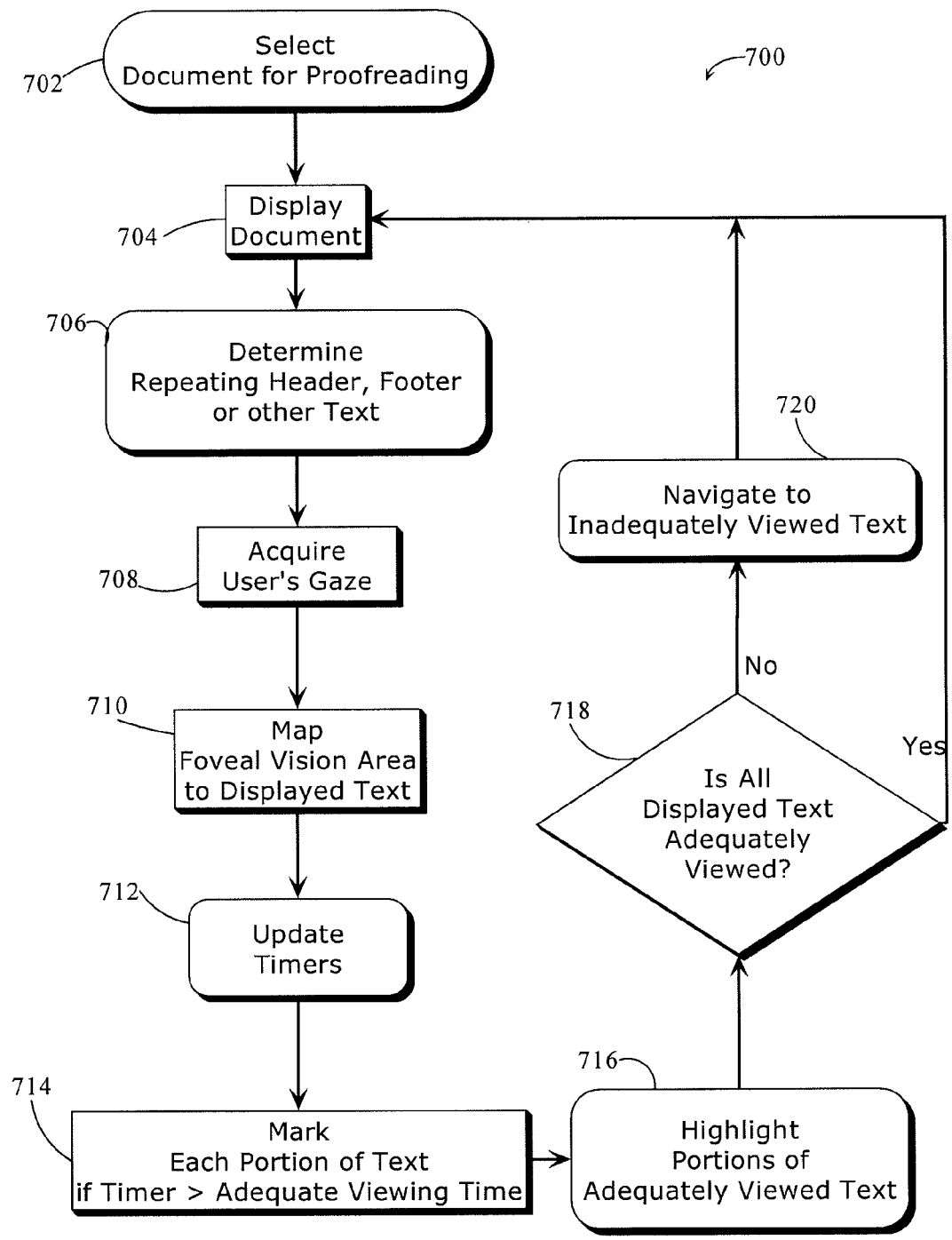
FIG. 23 shows a flowchart view illustrating a document verification system according to another preferred embodiment of the present invention.

FIG. 23 shows a flowchart view illustrating a document verification system according to another preferred embodiment of the present invention. Preferably, document viewing verification system 700 comprises various steps, as shown. Preferably, during step 702, the user selects a document for correlation and verification of adequately viewing during proofreading, as shown. Preferably, during step 704, the document is display to the user, as shown. Preferably, during step 704, the user may navigate to other portions of the document, as the user desires. Preferably, during optional step 706, any repeating portion of the text will be determined, such as header, footer, table of contents, outline, glossary or other portions of text, as shown. (At least embodying herein "text-determining means for determining at least one text"; or at least alternately embodying herein "at least one text-determiner to determine at least one text".) Preferably, during step 708, the direction of the users' gaze is determined, as shown. Preferably, during step 710, the texts that fall within the area corresponding to the foveal-vision is determined, as shown. Preferably, during optional step 712, the duration of the continuous correlation of the foveal-vision and the displayed text is updated. Preferably, during step 714, if the duration of continuous correlation exceeds the users minimum adequate viewing time, then each portion of the text is marked as adequately viewed, as shown.

Preferably, during optional step 716, the user may indicate that they desire to view the portions of text that have been adequately viewed, as shown. Alternately preferably, the user may indicate that they desire to view the portions of text that have not been adequately viewed.

Upon reading the teachings of this specification, those with ordinary skill in the art, will now understand that, under appropriate circumstances, considering issues such as document generation systems, document importance, imaging technology, user preference, economic considerations, etc., other types of indicators and indicating means, such as audible indicators, visual indicators, lights, alarms, etc., may suffice. (At least embodying herein "indicating means for indicating"; or at least alternately embodying herein "at least one indicator to indicate"; or at least alternately embodying herein "indicating at least one portion of at least one image".)

Preferably, during step 718, the user can request assistance in locating the next portion of inadequately viewed text. Preferably, during step 720, the system can automatically navigate, or scroll, to the next portion of text that requires adequate viewing, as shown. (At least embodying herein "navigating-assisting means for assisting navigating"; or at least alternately embodying herein "at least one navigation-assister to assist navigating"; or at least alternately embodying herein "assisting navigation".)

Figure 24:
FIG. 24 shows a diagrammatic view illustrating foveal-vision correlation data for a document according to another preferred embodiment of the present invention.

FIG. 24 shows a diagrammatic view illustrating foveal-vision correlation data for a document according to another preferred embodiment of the present invention. Preferably, correlation data structure 750 comprises user identifier 752, document identifier 756, text data 760, timer 764, repeating flag 766 and/or perceived flag 768, as shown. (At least embodying herein "at least one verifier to verify".) Preferably, text data 760 relates to a portion of the document being verified, as shown. Preferably, text data 760 may contain any indicator to any portion of a document, such as words, phrases, numbers, punctuation, etc., as shown. Preferably, timer 764 stores zero when the text data 760 has not yet been correlated to the foveal-vision, as shown. (At least embodying herein "at least one timer to time"; or at least alternately embodying herein "timing whether the duration of the correlation".) Preferably, timer 764 stores the number of milliseconds of correlation between the foveal-vision and the text data 760, as shown. Preferably, repeating flag 766 indicates whether this portion of document repeats on more than one page of the document, as shown. Preferably, adequately viewed flag 768 stores whether text data 760 as been adequately viewed, as shown.

Figure 25:
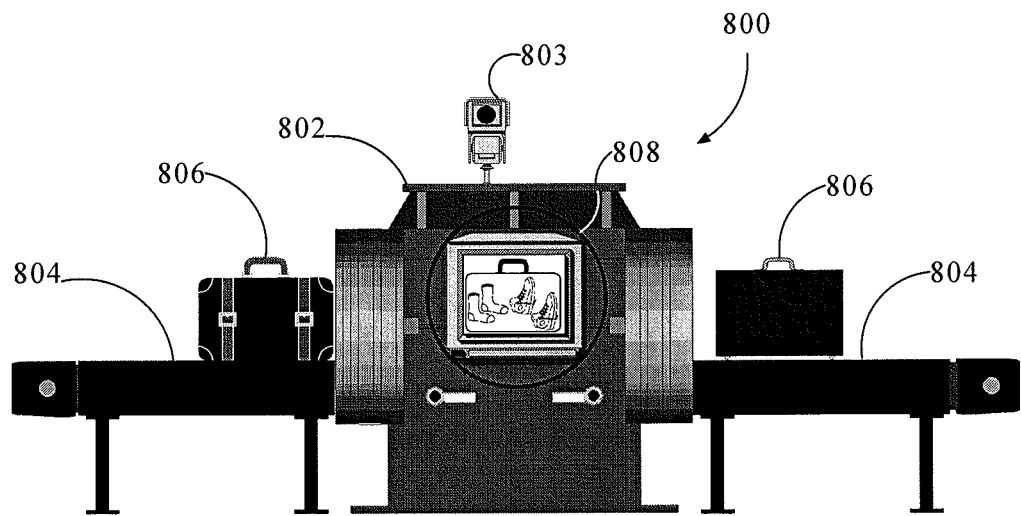
FIG. 25 shows a side view illustrating a security scanner viewing system according to another preferred embodiment of the present invention.

FIG. 25 shows a side view illustrating a security scanner viewing system according to another preferred embodiment of the present invention. Preferably, security scanner system 800 comprises x-ray scanner 802, video camera 803, conveyor 804, and display 810 (see FIG. 26) as shown. Preferably, an airline passenger places luggage 806 upon conveyor 804, as shown. Preferably, conveyor 804 moves luggage 806 through x-ray scanner 802, as shown. Preferably, x-ray scanner 802 will reveal the contents of luggage 806 by displaying an x-ray image on display 810, as shown. Preferably, video camera 803 will monitor the gaze of the user of security scanner system 800, as shown.

Figure 26:
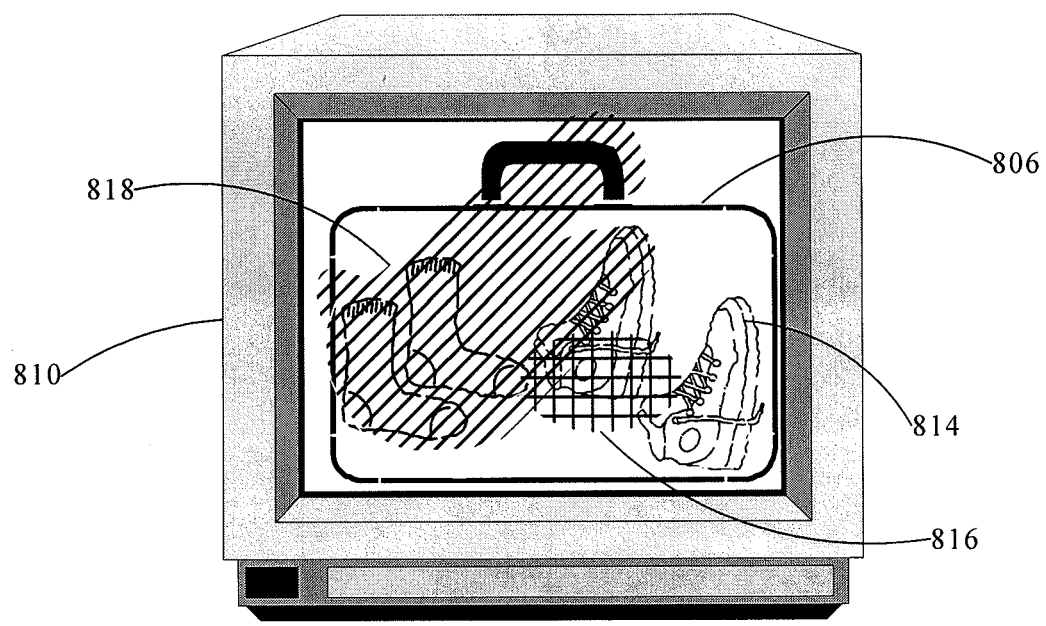
FIG. 26 shows a detailed view of Detail 808 of FIG. 25.

FIG. 26 shows a detailed view of Detail 808 of FIG. 25. Preferably, display 810 shows contents 814 of luggage 806. Preferably, security scanner system 800 will determine the direction of the users gaze by accepting input from video camera 803 (see FIG. 24), as shown. Preferably, security scanner system 800 will indicate area 816 that corresponds to the area of the foveal-vision of the user, as shown. Preferably, security scanner system 800 will track the previous area 818 that have been correlated to foveal-vision, as shown. Preferably, if any contents 814 would be moved from the display 810 before being correlated, security scanner system 800 would pause conveyor 804, thereby allowing the user to adequately view contents 814 of 806, as shown. Alternately preferably, the user may scroll backwards through stored luggage 806 (or images thereof) acquired by security scanner system 800 to reexamine portions of luggage 806 that have not be adequately viewed. Alternately preferably, adequate viewing of luggage 806 may require that that luggage 806 be viewed with more than one grayscale or color map to allow optimal evaluation of the information in the images.

Figure 27:
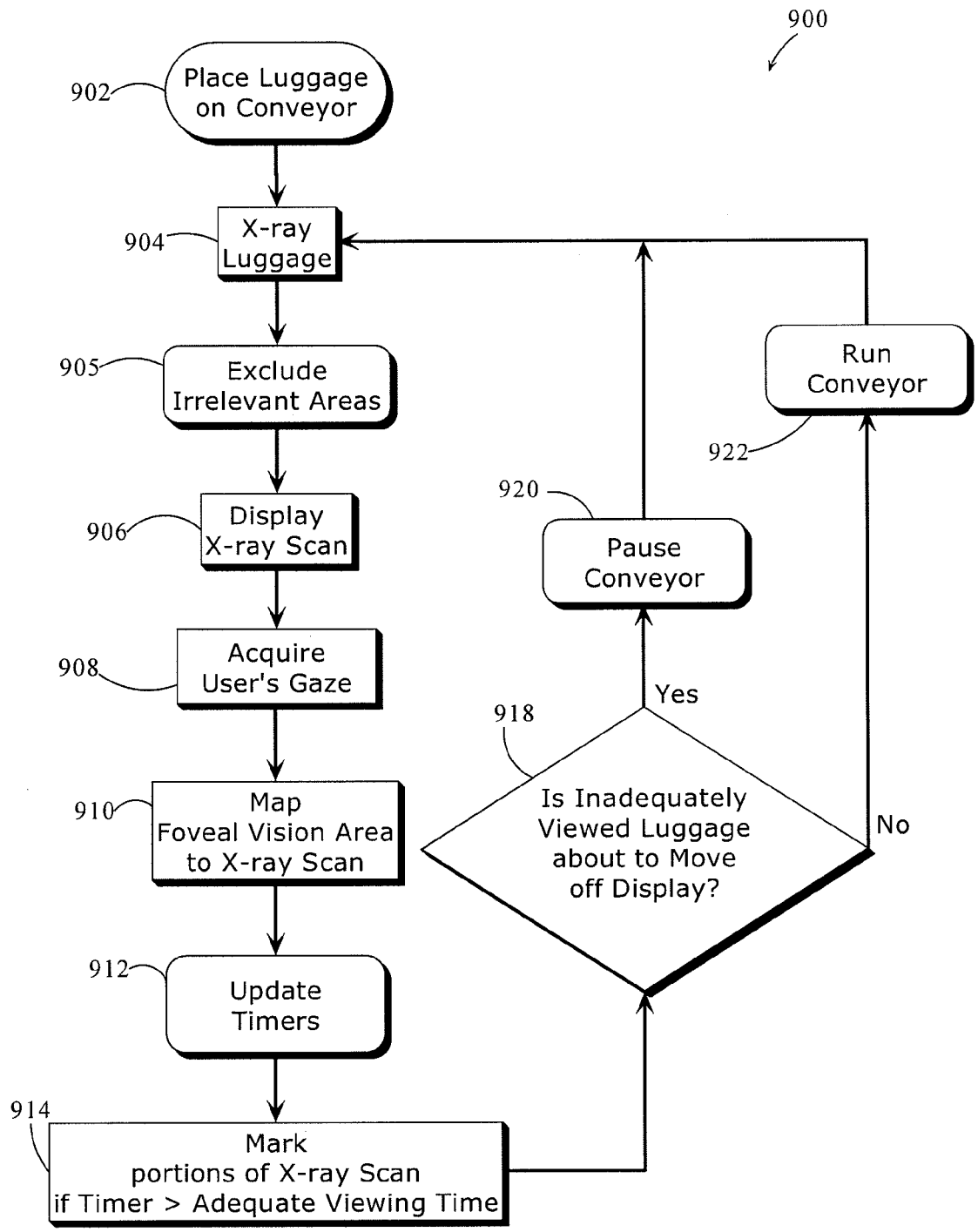
FIG. 27 shows a flowchart view illustrating a security scanning verification system according to another preferred embodiment of the present invention.

FIG. 27 shows a flowchart view illustrating a security scanning verification system according to another preferred embodiment of the present invention. Preferably, security scanning system 900 comprises various steps. Preferably, security-scanning system 900 allows retrieval of user's profile to determine the user's preferences, such as, for example, area of foveal-vision, minimum adequate viewing time, etc. Preferably, during step 902, a passenger places luggage upon a conveyor, as shown. Preferably, during step 904, security-scanning system 900 will x-ray (or other scanning methods) the luggage in order to produce an x-ray image of the contents, as shown. Preferably, during optional step 905, security-scanning system 900 could find portions of the image that can be excluded, as shown. Preferably, during step 905, security-scanning system 900 could excluded spaces between bags; portions of the image that represent background areas, such as a conveyor; empty space within a bag; or other patterns that don't correspond to the contents of the luggage that require adequate viewing. Preferably, during step 906, security-scanning system 900 will display the x-ray image to the user, as shown. Preferably, during step 908, security-scanning system 900 will determine the direction of the user's gaze, as shown. Preferably, during step 910, security-scanning system 900 will map the foveal-vision of the user to the corresponding area of the x-ray scan, as shown. (At least embodying herein "revealing at least one content"; or at least alternately embodying herein "at least one revealer to reveal at least one content"; or at least alternately embodying herein "revealing means for revealing".) Preferably, during optional step 912, security-scanning system 900 will update the timer for each portion of the x-ray scan image that is correlated to the foveal-vision of the user.

Preferably, during step 914, portions of the image which have been adequately viewed may be marked as adequately viewed, as shown. Preferably, security-scanning system 900 allows user to highlight areas marked as adequately viewed. (At least embodying herein "verifying means for verifying".) Alternately preferably, these areas may only be marked if the continuous duration of correlation of foveal-vision exceeds the user's minimum adequate viewing time, as shown. Preferably, during optional step 918, security-scanning system 900 can verify if luggage would move off the display that has contents which have not been correlated to foveal-vision and adequately viewed. (At least embodying herein "verifying means for verifying"; or at least alternately embodying herein "at least one verifier to verify"} Preferably, during step 920, security-scanning system 900 can pause the conveyor to allow the user additional time to adequately view the x-ray scan, as shown. Preferably, during optional step 922, security-scanning system 900 can run the conveyor to provide the user with additional luggage for viewing, as shown. (At least embodying herein "conveying means for conveying"; or at least alternately embodying herein "pausing means for pausing"; or at least alternately embodying herein "at least one conveyor to convey"; or at least alternately embodying herein "at least one pauser to"; or at least alternately embodying herein "conveying at least one container"; or at least alternately embodying herein "pausing conveying means".)

Although applicant has described applicant's preferred embodiments of this invention, it will be understood that the broadest scope of this invention includes modifications and implementations apparent to those skilled in the art after reading the above specification and the below claims. Such scope is limited only by the below claims as read in connection with the above specification. Further, many other advantages of applicant's invention will be apparent to those skilled in the art from the above descriptions and the below claims.

What is claimed is:

1. A method comprising:
    displaying at least a portion of an image on a display of a computing device;
    receiving information from an eye tracker indicating at least a gaze direction of a user of the computing device;
    based on at least the received gaze direction, determining, by the computing device, a foveal vision portion of the image, wherein the foveal vision portion is a portion of the image that is viewed by a foveal vision area of the user;
    determining, by the computing device, that respective portions of the image have been adequately viewed in response to determining that the respective portions have been included in the foveal vision portion of the image; and
    determining, by the computing device, whether the entire image has been adequately viewed by the user, wherein the entire image has been adequately viewed by the user if at least a meaningful portion of the image has been adequately viewed by the user.

2. The method of claim 1, wherein said determining that respective portions of the image have been adequately viewed comprises monitoring and updating respective time periods that portions of the image are in the foveal vision portion of the image.

3. The method of claim 2, wherein respective portions of the image are determined to have been adequately viewed in response to the respective portion having been in the foveal vision portion of the image for at least a predetermined time period.

4. The method of claim 3, further comprising:
    marking the image as read in response to determining that at least the meaningful portion of the image has been adequately viewed.

5. The method of claim 1, wherein said determining that respective portions of the image have been adequately viewed comprises determining whether respective portions of the image have been viewed according to one or more display settings.

6. The method of claim 5, wherein the display settings comprises one or more of a magnification level, a window type, or a window level.

7. The method of claim 1, further comprising:
    in response to detecting an attempt to mark the image as read and determining that the image has not been adequately viewed, providing a visual and/or audible message indicating that the image has not been adequately viewed.

8. The method of claim 1, further comprising:
    accessing one or more preferences associated with the user that indicate one or more of an area of foveal vision of the user or a predetermined time period for which respective portions of the image must be included in the foveal vision portion of the image in order to determine that respective portions have been adequately viewed.

9. The method of claim 1, further comprising:
    determining, by the computing device, the meaningful portion of the image.

10. A computing system comprising:
    one or more processors configured to execute instructions in order to cause the computing system to:
        selectively display portions of respective images of a group of images;
        receive information from an eye tracker indicating at least a gaze direction of a user of the computing device;
        based on at least the received gaze direction, determine a foveal vision portion of one or more images displayed, wherein the foveal vision portion is a portion of the one or more images that is viewed by a foveal vision area of the user;
        determine that respective portions of images have been adequately viewed in response to determining that the respective portions have been included in the foveal vision portion of the one or more images displayed; and
        determine whether the entire group of images has been adequately viewed by the user, wherein the entire group of images is determined to be adequately viewed if at least meaningful portions of respective images of the group of images have been adequately viewed by the user.

11. The computing system of claim 10, wherein the group of images comprises a medical image series.

12. The computing system of claim 10, wherein the group of images comprises images acquired at different times.

13. The computing system of claim 10, wherein said selectively displaying portions of respective images of the group of images is controlled by input from the user.

14. The computing system of claim 10, wherein the group of images comprises images of a luggage item.

15. The computing system of claim 10, wherein the group of images comprises images acquired from a security scanner, word processing documents, security scan x-rays, security videos, security photographs, satellite photographs, images viewed by air traffic controllers, or images displayed on computer displays to pilots.

16. The computing system of claim 14, wherein the instructions are further configured to determine the meaningful portion of the group of images.

17. The computing system of claim 14, wherein said determining whether the group of images has been adequately viewed by the user is performed in response to the luggage item at least partially moving past an image acquisition device, wherein the instructions are further configured to cause the computing system to initiate pausing of movement of the luggage item in response to determining that not all relevant portions of the images of the group of images have been adequately viewed by the user.

18. The computing system of claim 14, wherein the group of images is only determined to be adequately viewed if at least some of the images are displayed with more than one grayscale or color map.

19. A computing system comprising:
    a storage device storing software instructions;
    one or more processors configured to execute the software instructions stored on the storage device in order to cause the computing system to:
        display at least a portion of an image on a display of a computing device;

receive information from an eye tracker indicating at least a gaze direction of a user of the computing device;

based on at least the received gaze direction, determine a foveal vision portion of the image, wherein the foveal vision portion is a portion of the image that is viewed by a foveal vision area of the user;

determine that respective portions of the image have been adequately viewed in response to determining that the respective portions have been included in the foveal vision portion of the image; and determine whether the entire image has been adequately viewed by the user, wherein the entire image has been adequately viewed by the user if at least a meaningful portion of the image has been adequately viewed by the user.

20. The computing system of claim 19, wherein said determining that respective portions of the image have been adequately viewed comprises monitoring and updating respective time periods that portions of the image are in the foveal vision portion of the image.

21. The computing system of claim 19, wherein the instructions are further configured to cause the computing system to automatically determine the meaningful portion of the image.

* * * * *